(12) United States Patent
Young et al.

(10) Patent No.: US 7,455,302 B2
(45) Date of Patent: Nov. 25, 2008

(54) CHUCK WITH SPINDLE LOCK

(75) Inventors: Gary L. Young, Six Mile, SC (US);
Theodore G. Yaksich, Seneca, SC (US)

(73) Assignee: The Jacobs Chuck Manufacturing Company, Clemson, SC (US)

( * ) Notice: Subject to any disclaimer, the term of this patent is extended or adjusted under 35 U.S.C. 154(b) by 376 days.

(21) Appl. No.: 10/914,649

(22) Filed: Aug. 9, 2004

(65) Prior Publication Data

US 2006/0027978 A1    Feb. 9, 2006

(51) Int. Cl.
*B23B 31/163* (2006.01)
(52) U.S. Cl. .......................................... 279/62; 279/902
(58) Field of Classification Search ................... 279/61, 279/62, 902, 150, 60, 63, 71
See application file for complete search history.

(56) References Cited

U.S. PATENT DOCUMENTS

| | | | | |
|---|---|---|---|---|
| 2,716,555 | A * | 8/1955 | Rowe | 279/56 |
| 3,237,955 | A | 3/1966 | McCarthy et al. | 279/63 |
| 3,325,166 | A | 6/1967 | McCarthy et al. | 279/63 |
| 3,506,277 | A | 4/1970 | Harms | 279/1 |
| 3,545,776 | A | 12/1970 | Haviland | 279/63 |
| 4,097,054 | A * | 6/1978 | Derbyshire | 279/64 |
| 4,154,450 | A * | 5/1979 | Derbyshire | 279/64 |
| 4,277,074 | A * | 7/1981 | Kilberis | 279/60 |
| 4,317,578 | A * | 3/1982 | Welch | 279/60 |
| 4,395,170 | A | 7/1983 | Clarey | 408/241 |
| 4,498,682 | A | 2/1985 | Glore | 279/1 |
| 4,526,497 | A | 7/1985 | Hatfield | 408/240 |
| 4,669,932 | A | 6/1987 | Hartley | 408/239 |
| 4,682,918 | A | 7/1987 | Palm | 408/241 |
| 4,824,298 | A * | 4/1989 | Lippacher et al. | 408/240 |
| 5,195,760 | A * | 3/1993 | Wheeler et al. | 279/60 |
| 5,330,204 | A * | 7/1994 | Huff et al. | 279/62 |
| 5,458,345 | A * | 10/1995 | Amyot | 279/62 |
| 5,624,125 | A | 4/1997 | Rohm | 279/62 |
| 5,951,026 | A * | 9/1999 | Harman et al. | 279/143 |
| 5,988,653 | A | 11/1999 | Kuo | 279/62 |
| 5,992,859 | A | 11/1999 | Lin | 279/62 |
| 6,047,971 | A * | 4/2000 | Harman et al. | 279/143 |
| 6,056,298 | A * | 5/2000 | Williams | 279/150 |
| 6,073,939 | A | 6/2000 | Steadings et al. | 279/62 |
| 6,079,716 | A * | 6/2000 | Harman et al. | 279/75 |
| 6,179,301 | B1 | 1/2001 | Steadings et al. | 279/62 |
| 6,196,554 | B1 * | 3/2001 | Gaddis et al. | 279/63 |

(Continued)

*Primary Examiner*—David P. Bryant
*Assistant Examiner*—Eric A Gates
(74) *Attorney, Agent, or Firm*—Nelson Mullins Riley & Scarborough, LLP

(57) ABSTRACT

A chuck has a generally cylindrical body having a nose section and a tail section, the tail section being configured to rotate with the drive shaft of a driver and the nose section having an axial bore formed therein. A plurality of jaws movably disposed with respect to the body and in communication with the axial bore. A nut rotatably mounted about the body and in operative communication with the jaws. A catch formed on one of the drive shaft and the chuck body that receives a lock body forward of and rotationally fixed to the driver housing. The lock body is moveable between a first unlocked position at which said chuck body is rotatable with respect to the driver housing and a second lock position at which said lock body engages said catch to rotationally lock said chuck body to the driver housing.

15 Claims, 19 Drawing Sheets

U.S. PATENT DOCUMENTS

| | | | |
|---|---|---|---|
| 6,241,259 B1 * | 6/2001 | Gaddis et al. | 279/63 |
| 6,247,706 B1 | 6/2001 | Kuo | 279/62 |
| 6,257,596 B1 | 7/2001 | Yang | 279/62 |
| 6,293,559 B1 * | 9/2001 | Harman et al. | 279/75 |
| 6,435,521 B2 | 8/2002 | Steadings et al. | 279/62 |
| 6,488,287 B2 * | 12/2002 | Gaddis et al. | 279/63 |
| 6,550,786 B2 * | 4/2003 | Gifford et al. | 279/75 |

* cited by examiner

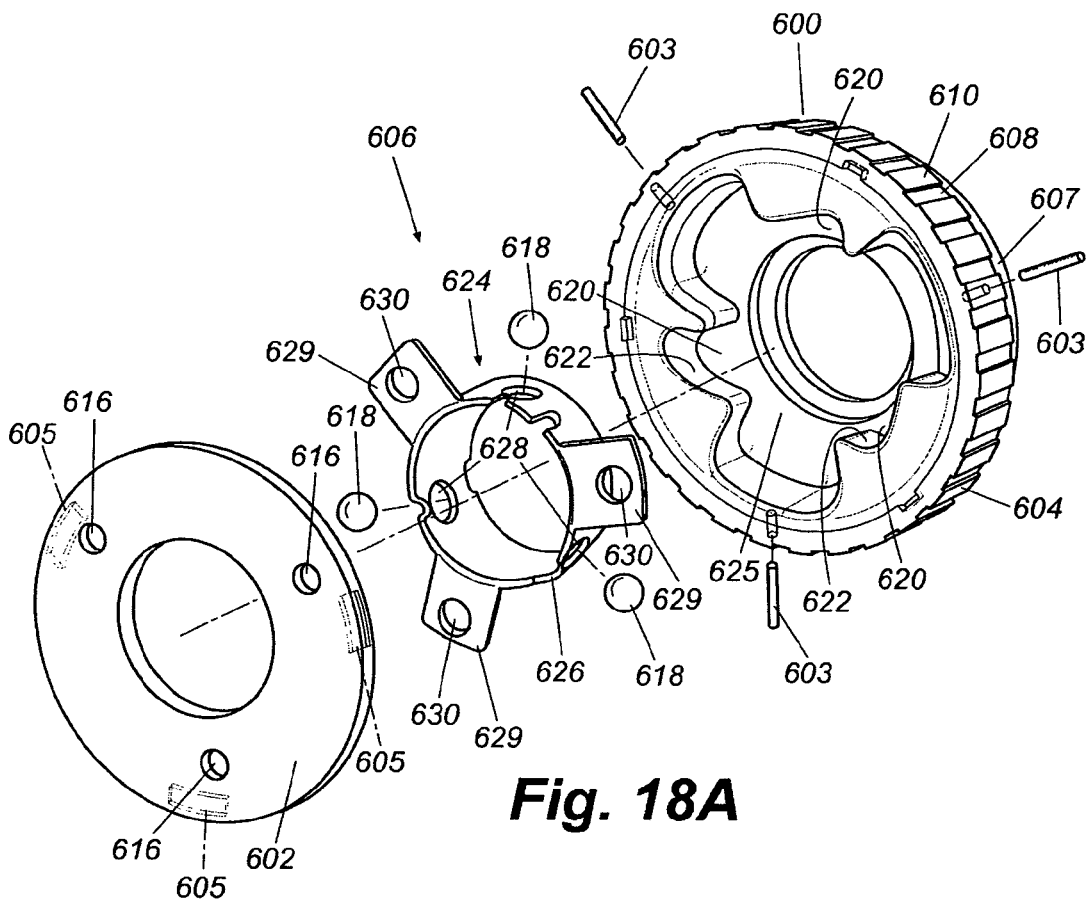
Fig. 18A
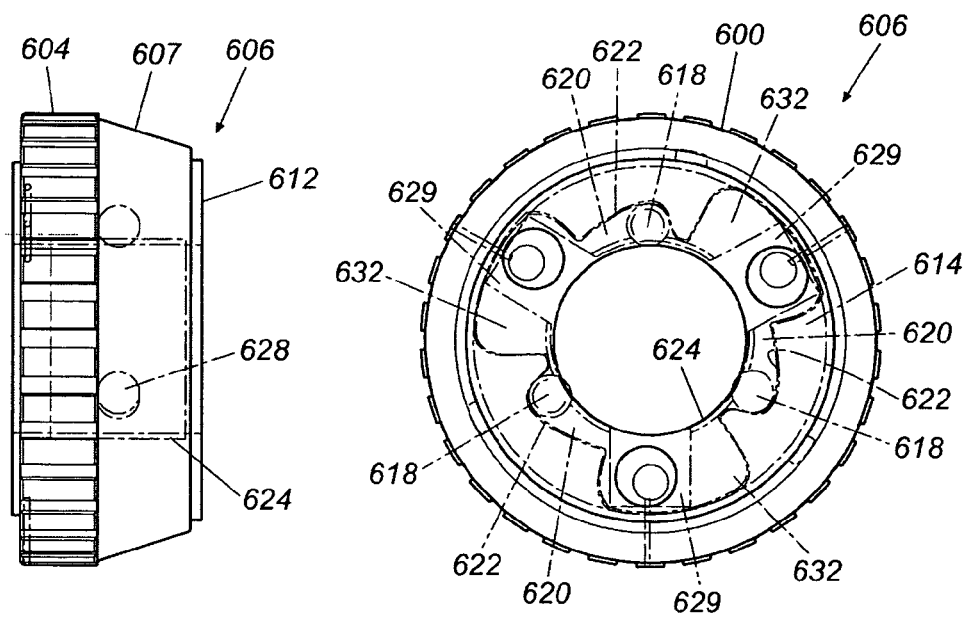
Fig. 18B  Fig. 18C

CHUCK WITH SPINDLE LOCK

FIELD OF THE INVENTION

The present invention relates generally to chucks for use with drills or with electric or pneumatic power drivers. More particularly, the present invention relates to a chuck of the keyless type having a spindle lock.

BACKGROUND OF THE INVENTION

Hand, electric and pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120 degrees apart from each other. The passageways are configured so that their center lines meet at a point along the chuck axis forward of the chuck. The passageways constrain three jaws that are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached to the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand.

Various configurations of keyless chucks are known in the art and are desirable for a variety of applications. In the case of a two sleeve chuck, the front sleeve is preferably rotationally coupled to the nut and the rear sleeve is rotationally coupled to the chuck body. Thus, rotation of the front sleeve relative to the rear sleeve causes the jaws to move within the chuck body in either the opening or closing direction, depending on the direction of relative rotation. In a single sleeve design, however, rotation of the chuck body relative to the single sleeve, and therefore the nut, is generally accomplished by actuating the drill unit while an operator holds the sleeve. It is also known to provide a sleeve on the driver housing that is rotationally fixed to, but axially moveable with respect to, the housing. This sleeve is moveable into engagement with the chuck sleeve so that the sliding sleeve rotationally fixes the chuck sleeve and the nut to the driver housing. Upon activation of the driver, therefore, the driven spindle rotates the chuck body relative to the rotationally fixed sleeve and nut, thereby opening or closing the chuck depending on the spindle's rotational direction.

SUMMARY OF THE INVENTION

The present invention recognizes and addresses considerations of prior art constructions and methods. In one embodiment of the present invention, a chuck has a generally cylindrical body having a nose section and a tail section, the tail section being configured to rotate with the drive shaft of a driver and the nose section having an axial bore formed therein. A plurality of jaws is movably disposed with respect to the body and in communication with the axial bore. A nut rotatably mounted about the body and in operative communication with the jaws moves the jaws towards and away from the axis of the axial bore depending on the direction of rotation of the nut relative to the chuck body. A catch formed on one of the drive shaft and the chuck body receives a lock body forward of and rotationally fixed to the driver housing. The lock body is moveable between a first unlocked position at which said chuck body is rotatable with respect to the driver housing and a second lock position at which the lock body engages said catch to rotationally lock said chuck body to the driver housing.

In another embodiment, a chuck has a generally cylindrical body having a nose section and a tail section, the tail section being configured to rotate with the drive shaft of the driver and said nose section having a first axial bore formed therein. A plurality of jaws is movably disposed with respect to the body in communication with the axial bore. A nut rotatably mounted about the body and in operative communication with the jaws moves the jaws towards and away from the axis of the axial bore depending on the direction of rotation of the nut relative to the chuck body. A sleeve is received about and rotationally coupled to the nut so that rotation of the sleeve rotates the nut. An annular collar received intermediate the chuck body and the driver housing defines a polygonally shaped axial bore therethrough that receives a polygonally shaped portion of the driver housing to rotationally fix the annular collar to the driver housing. Additionally, the first annular collar is moveable between a first unlocked position at which the chuck body is rotatable with respect to the driver housing and a second lock position at which the polygonally shaped axial bore receives the polygonally shaped driver housing portion to rotationally lock the chuck body to the driver housing.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 18A is an exploded view of the spindle lock shown in FIG. 17;

FIG. 18B is a side plan view of the spindle lock shown in FIG. 18A;

FIG. 18C is top plan view of the spindle lock of FIG. 18A; and

Figure 1:
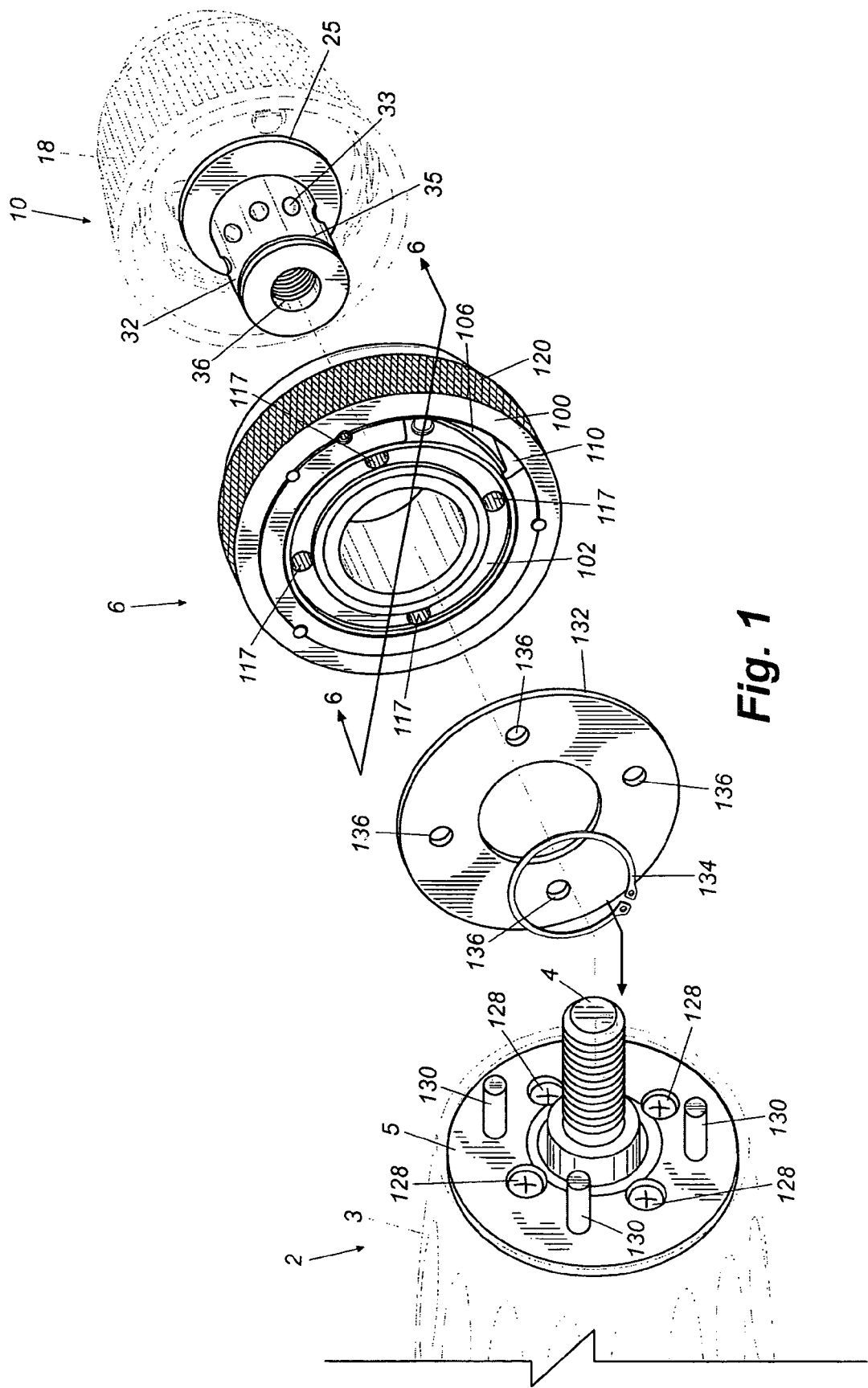
FIG. 1 is an exploded view of a chuck and spindle lock in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a driver 2 having a spindle lock 6 and a keyless chuck 10. Driver 2 includes a housing 3, a threaded spindle 4 and an adapter plate 5, which will be explained in greater detail below. Driver 2 may be, for example, a handheld electric or pneumatic drill, and may therefore include an electric motor (not shown) that rotationally drives threaded spindle 4 in the clockwise and counterclockwise direction. Such drills should be well understood in this art and are therefore not discussed in detail herein.

Keyless chucks are actuated by relative rotation between a nut and a chuck body. For example, a hand gripable first sleeve may be provided in communication with the nut while a second hand gripable sleeve, which is independent of the first sleeve, may be rotationally attached to the body. Thus, a user may rotate the first sleeve with one hand while gripping the second sleeve with the other hand, thereby holding the body still. Dual sleeve chucks require the user to use both hands to open or close the chuck. Alternatively, in some devices in which only a single sleeve is provided that extends generally over the entire length of the chuck body a user may grip the single sleeve and actuate the tool driver to rotate the spindle, thereby rotating the chuck body with respect to the nut. Instead of actuating the driver, a mechanism may be located in the driver or rearward of the single sleeve that locks the spindle of the driver to the housing when the driver is not actuated, thus enabling the user to use one hand to open or close the chuck.

The illustration and discussion of a single sleeve chuck is presented in the figures to facilitate an understanding of the present invention. It should be understood that other types of chucks may be used. For example, other single sleeve or dual sleeve chucks may be used in the present invention, and such chucks may include locking mechanisms, torque indicators, and/or quick change mechanisms. In short, the present invention contemplates the use of many types of chucks, but in a preferred embodiment shown in the figures a single sleeve chuck is illustrated. Examples of single sleeve chuck designs that may be used with the present invention include, but are not limited to, the single sleeve chucks disclosed in U.S. Pat. No. 5,934,689 to Montjoy, issued Aug. 10, 1999, U.S. Pat. No. 6,168,170 to Miles et al., issued Jan. 2, 2001 and U.S. Pat. No. 6,354,605 to Aultman, issued Mar. 12, 2002, the entire disclosures of each being incorporated by reference herein.

Figure 2:
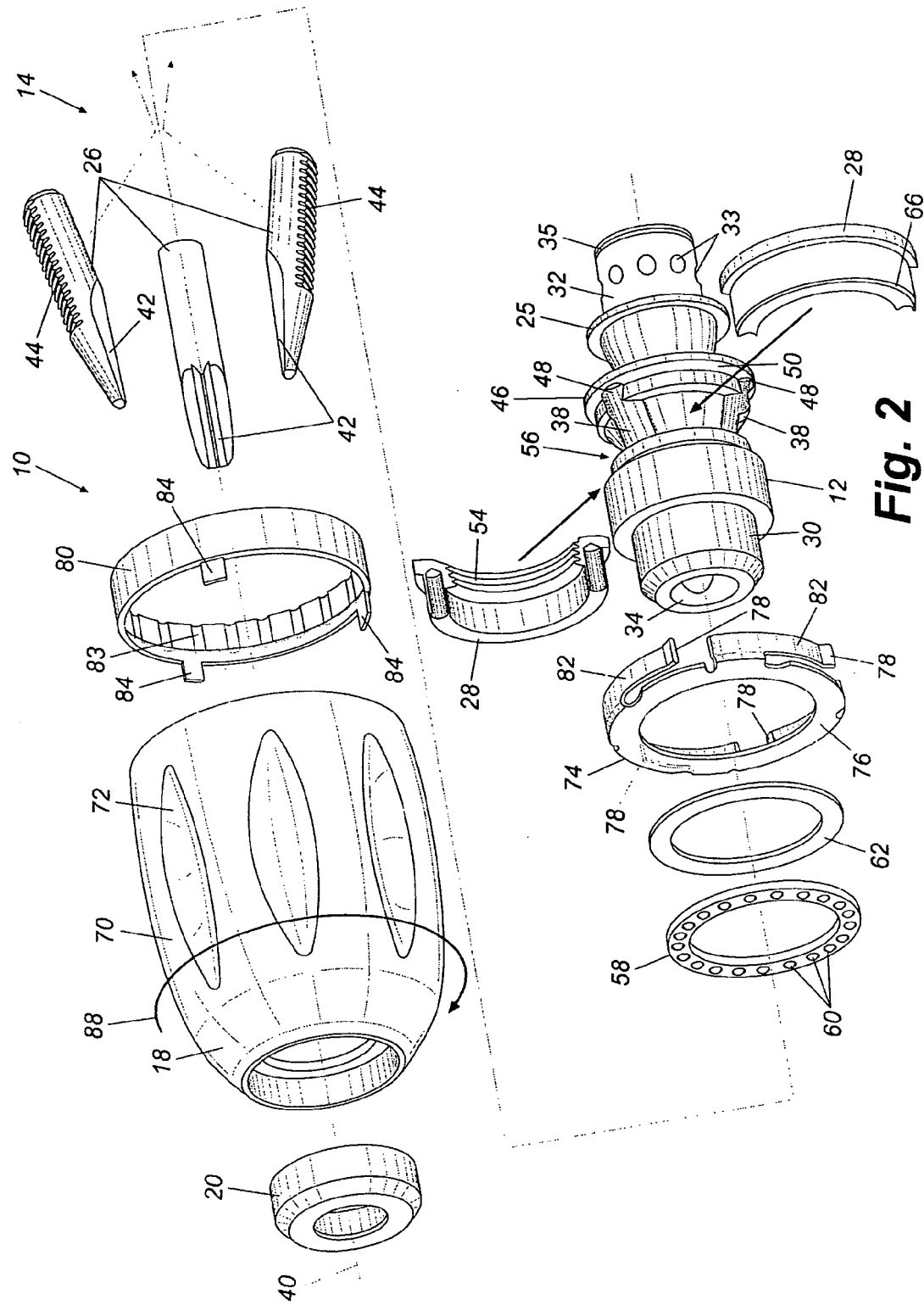
FIG. 2 is an exploded view of the chuck shown in FIG. 1.
Figure 3:
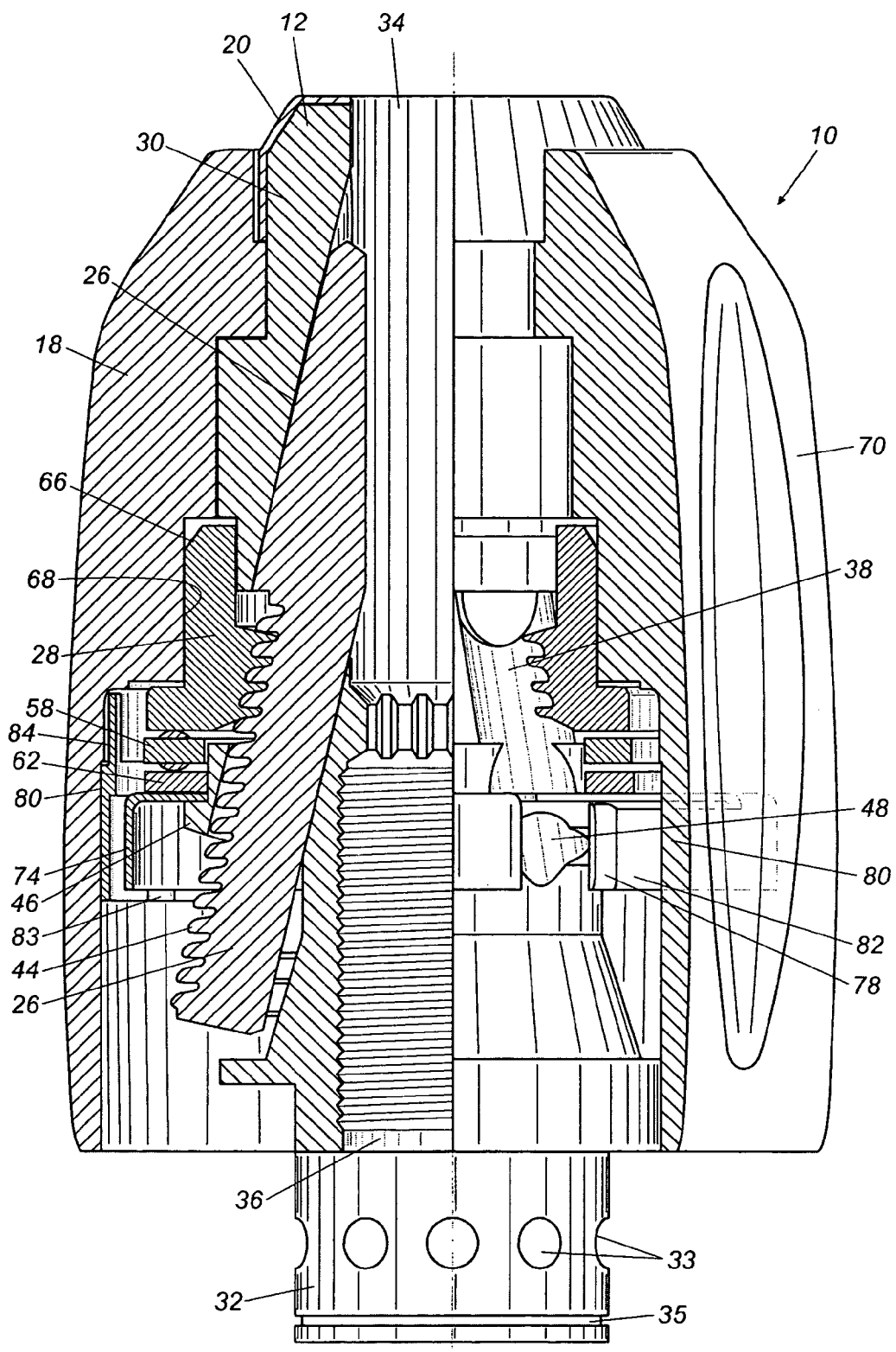
FIG. 3 is a longitudinal view, in cross section, of the chuck shown in FIG. 1.

Referring to FIGS. 2 and 3, chuck 10 has a body 12, a gripping mechanism, generally 14, a sleeve 18, a nose piece 20, and a nut 28. Gripping mechanism 14 includes a plurality of jaws 26. Body 12 is generally cylindrical in shape and has a nose or forward section 30 and a tail or rearward section 32. An axial bore 34 formed in forward section 30 is dimensioned somewhat larger than the largest tool shank that chuck 10 is designed to accommodate. A threaded bore 36 is formed in tail section 32 and is of a standard size to mate with spindle 4 (FIG. 1). Bores 34 and 36 may communicate at a central region of body 12. While a threaded bore 36 is illustrated, such bore is interchangeable with a tapered bore of a standard size to mate with a tapered drive shaft. Furthermore, body 12 may be formed integrally with the drive shaft. Body tail section 32 defines a catch in the form of a plurality of equally spaced recesses 33 about an outer circumference of a portion of the tail section. An annular groove 35 is located intermediate recesses 33 and the end of body tail section 32. A catch should be understood to be a device for fastening or for checking motion, and may include other structures such as a shoulder or raised surface.

Body 12 defines three passageways 38 that accommodate jaws 26. Each jaw 26 is separated from each adjacent jaw by an arc of approximately 120 degrees. The axis of passageways 38 and jaws 26 are angled with respect to the chuck center axis 40 such that each passageway axis travels through axial bore 34 and intersects axis 40 at a common point. Each jaw 26 has a tool engaging face 42 generally parallel to chuck axis 40 and threads 44 formed on the jaw's opposite or outer surface that may be constructed in any suitable type and pitch.

Body 12 includes a thrust ring member 46 which, in a preferred embodiment, may be integral with body 12. In an alternative embodiment, thrust ring member 46 may be a separate component from body 12 that is axially and rotationally fixed to the chuck body by interlocking tabs, press fitting or other suitable connection means. Thrust ring member 46 includes a plurality of jaw guideways 48 formed around its circumference to permit retraction of jaws 26 therethrough and also includes a ledge portion 50 to receive a bearing assembly as described below.

Nut 28, which in the preferred embodiment is a split nut, defines female threads 54 located on an inner circumference of the nut and is received in a groove 56 formed in chuck body 12 proximate thrust ring member 46. An annular bearing cage 58 and a bearing washer 62 are received between thrust ring 46 and nut 28. Bearing cage 58 holds a plurality of balls 60 that permit the nut to rotate relative to the chuck body. Nut 28 is shown in FIG. 2 without serrations or knurling on its outer circumference. However, it should be understood that the nut may be formed with axially-aligned teeth, or other forms of knurling, on its outer circumference, and its outer edges may be provided with a small chamfer 66 (FIG. 3) to facilitate press fitting of the nut into a bore 68 (FIG. 3) of sleeve 18.

As should be well understood in the art, nut 28 may also be a unitary nut (not shown in the figures) that is in operative engagement with sleeve 18 through drive dogs or other coupling methods. Use of a unitary nut requires that the chuck body be configured to allow the unitary nut to slide over the body into engagement with the jaws and a nut retainer to axially retain the nut in engagement with the jaws. Examples of chucks with unitary nuts include U.S. Pat. No. 6,540,237 to Temple-Wilson, issued Apr. 1, 2003, U.S. Pat. No. 6,536,781 to Barton et al., issued Mar. 25, 2003 and U.S. Pat. No. 6,279,918 to Barton et al., issued Aug. 28, 2001, the entire disclosures of each being incorporated by reference herein.

Preferably, sleeve 18 is molded or otherwise fabricated from a structural polymer such as a polycarbonate, a filled polypropylene, e.g., glass-filled polypropylene, or a blend of structural polymer materials. Other composite materials such as graphite filled polymerics may also be suitable in certain environments. As should be appreciated by one skilled in the art, the materials from which the chuck of the present invention is fabricated will depend on the end use of the chuck, and the above materials are provided by way of example only.

An outer circumferential surface 70 of sleeve 18 may be knurled or may be provided with longitudinal recesses 72 or other protrusions to enable the operator to grip it securely. Sleeve 18 is press fit to nut 28 to rotationally and axially secure the sleeve to the nut. The press fitting of nose piece 20 to body nose section 30 also helps to retain sleeve 18 against forward axial movement. Nose piece 20 may be coated with a non-ferrous metallic coating to prevent rust and to enhance its appearance. Examples of suitable coatings include zinc or nickel, although it should be appreciated that any suitable coating could be utilized.

Because sleeve 18 is rotationally fixed to nut 28, the sleeve's rotation with respect to body 12 also rotates nut 28 with respect to the body, which moves jaws 26 axially within passageways 38 due to the engagement of jaw threads 44 and nut threads 54. The direction of axial movement of jaws 26 depends on the rotational direction of sleeve 18 and nut 28 with respect to body 12. If a tool, such as a drill bit, is inserted into bore 34, the sleeve and nut may be rotated about chuck axis 40 in a closing direction 88 (FIG. 2) so that jaws 26 move to a closed position wherein jaw tool engaging surfaces 42 grippingly engage the tool. Rotation of sleeve 18 and nut 28 about axis 40 in the opposite or opening direction moves the jaws axially rearward out of the closed position to an open position as illustrated in FIG. 3.

Chuck 10 includes a tightening torque indicator comprising an annular ring 74 and an annular ratchet 80. Annular ring 74 defines an inwardly extending flange 76 and has four pawls 78 that are connected to the ring via spring tabs 82. Spring tabs 82 bias the pawls radially outward from chuck axis 40 into engagement with annular ratchet 80. Annular ratchet 80 defines forwardly extending tabs 84 and a plurality of recessed grooves 83 formed on an inner circumference of the main ratchet band. It should be understood that the chuck of the present embodiment can function with at least one pawl, but a preferred audible click is achieved with between preferably three or four pawls depending on the number of grooves 83. That is, the number of grooves is preferably an equal multiple of the number of pawls so that each pawl simultaneously engages a corresponding groove.

As described in more detail below, ring 74 can rotate with respect to ratchet 80 when the chuck jaws tighten onto a tool. Such relative rotation between the ring and the ratchet produces an audible "clicking" sound as pawls 78 move from one set of grooves 83 to a succeeding set. In the present embodiment, grooves 83 are spread apart from each other so that the first such audible indicator occurs at a point at which a gripping force applied by the jaws to the tool has been achieved that is sufficient to secure the tool in the chuck for expected normal operation without slipping of the tool in the jaws. Thus, the first clicking sound following the jaws' engagement of the tool notifies the user that the desired tightening torque has been achieved and that the user may therefore stop tightening the chuck. Of course, the level of desired gripping force might vary among different circumstances. Once the desired gripping force is defined, however, the degree to which the sleeve should be rotated to achieve the desired gripping force, and therefore the angular spacing between the adjacent grooves 83 needed to provide the first audible click at the desired gripping force, depends upon the chuck's design and construction.

Generally, for a given chuck design and construction, there exists a linear relationship between input torque applied to the sleeve and nut after the jaws grip a tool and gripping force applied by the jaws to the tool. Thus, a given input torque can be expected to result in a predictable gripping force. The proportional relationship between input torque and gripping force for a given chuck depends upon design and construction factors, including but not limited to the thread pitch of the jaws and the nut, lubrication between the chuck's moving parts, finishes on the surfaces of the moving parts, the bearing system employed, the area of contact between abutting surfaces that move relative to each other, and the angle of the jaw passageways relative to the central axis of the body. Consequently, varying one or more of the above chuck characteristics can result in an increase or decrease in the ratio of input torque to output gripping force.

Figure 4A:
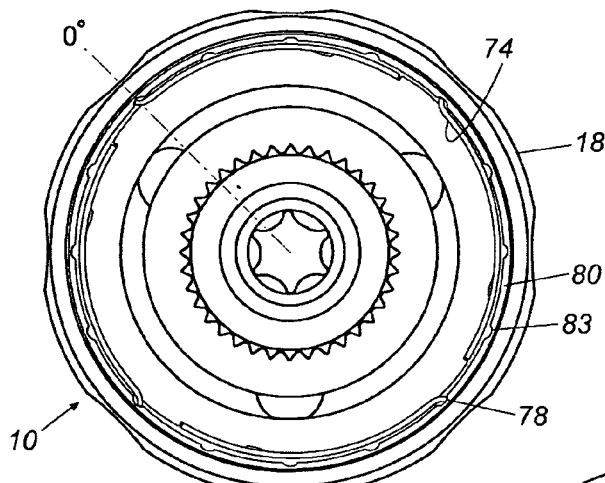
FIGS. 4A-4C are bottom plan views of the chuck shown in FIG. 1.
Figure 4B:
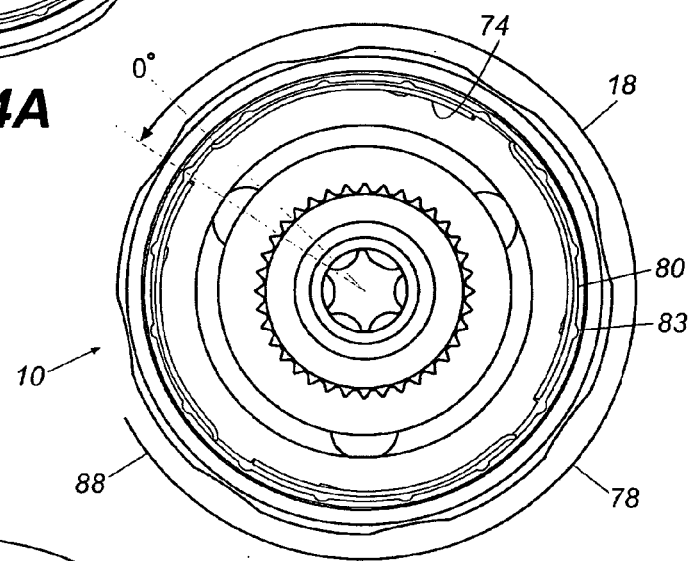
Figure 4C:
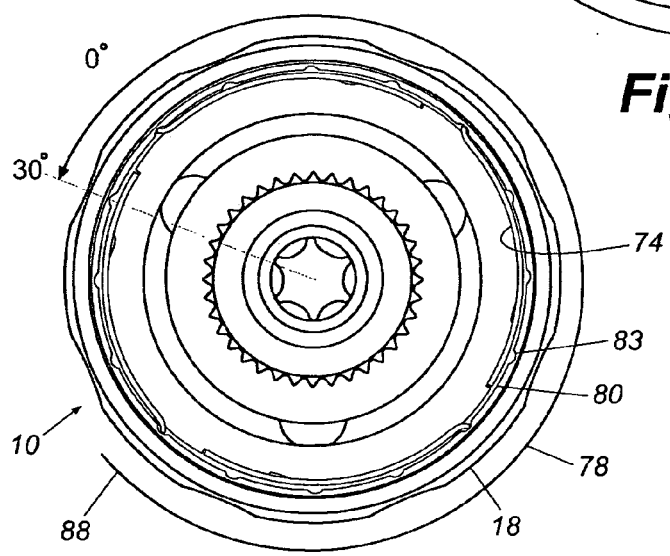

Thus, where the relationship between input torque and output gripping force is known for a given chuck arrangement, the desired angular spacing between grooves 83 can be determined by measuring the rotation of the sleeve and nut needed to achieve an input torque that corresponds to the desired gripping force. For example, with a tool shank placed in axial bore 34, sleeve 18 may be rotated until the jaws engage the shank and the nut stops rotating relative to chuck body 12. A torque wrench is then attached to sleeve 18, and the sleeve is rotated by the torque wrench in the closing direction until the input on the torque wrench reads approximately the target input torque. The angle between the torque wrench starting point and ending point is equal to the angular rotation the sleeve and nut must rotate to produce the required input torque to result in the desired output gripping force. For the chuck embodiment illustrated in FIGS. 2-3, the angular rotation is approximately 30 degrees (FIGS. 4A-4C). The last step is to determine the number of times the measured angle divides into 360 degrees. In the present example, 30 degrees goes into 360 degrees twelve times. Thus, annular ratchet 80 is formed with twelve recessed grooves 83 equally spaced about the inner circumference of the ratchet.

Of course, it is possible, and in fact likely, that the measured angle will not divide into 360 degrees by a whole number. In that event, the number of grooves is preferably at most the next lowest whole number. For example, assume that the angle measured by the torque wrench to achieve the desired gripping force is 25 degrees. Twenty five degrees divides into 360 degrees 14.4 times. At most, 14 grooves should preferably be provided in the sleeve. Fourteen grooves provide the spacing closest to that which corresponds to the desired input torque and output gripping force. More than 14 evenly distributed grooves would result in a first click prior to the point at which the desired input torque and output gripping force are achieved. Fewer than 14 evenly-spaced grooves would result in the user applying more torque than necessary to achieve the minimum desired gripping force, but such arrangements may be desirable. For example, the number of grooves 83 should be a whole multiple of the number of pawls 78 so that all pawls simultaneously engage respective grooves. Thus, assume in the above example that it is desired to have four pawls. Four does not divide evenly into 14, and the number of grooves would preferably be adjusted downward to 12 grooves, the first whole multiple of four that is less then 14.

Once again referring to FIG. 3, annular ring 74 is received on chuck body 12 intermediate bearing washer 62 and thrust ring 46. Annular ratchet 80 is received about annular ring 74 and nut 28 so that grooves (not shown) formed on the inner circumference of sleeve 18 receive respective tabs 84. The width of the grooves is larger than the width of tabs 84 so that sleeve 18 is rotatable over a limited angular distance relative to annular ratchet 80.

To close the chuck from an open condition, and referring to FIGS. 3 and 4A-4C, nut 28 is rotated via sleeve 18 in closing direction 88 so that jaws 26 are threadedly moved axially forward within the jaw passageways. Because tabs 84 sit against the driving edges of the sleeve grooves, annular ratchet 80 rotates in conjunction with sleeve 18. Annular ring 74 also rotates with sleeve 18 since pawls 78 rotationally fix annular ring 74 to annular ratchet 80. Once jaws 26 clamp onto a tool shank, however, a corresponding axial force is increasingly exerted rearwardly through jaws 26 to nut 28. The rearward axial force is transmitted through nut 28 to chuck body 12, and in particular against thrust ring 46. Because annular ring flange 76 is intermediate bearing washer 62 and thrust ring ledge 50, axial force is transmitted from nut 28 through annular ring flange 76 to thrust ring 46. This increases the frictional forces between annular ring flange 76, thrust ring washer 62 and thrust ring 46 in a direction opposite to the direction that sleeve 18 and nut 28 are being rotated. Accordingly, the frictional forces restrain rotation of annular ring 74 with respect to body member 12 (FIG. 4A).

Referring to FIG. 4B, however, bearing 58 permits sleeve 18 and nut 28 to continue to rotate relative to chuck body 12 and annular ring 74 in closing direction 88. Additionally, since pawls 78 are deflectable, annular ratchet 80 continues to rotate with sleeve 18 relative to annular ring 74. Thus, as annular ratchet 80 rotates, the distal end of pawls 78 ride over the flat inner surface of annular ratchet 80 between adjacent recessed grooves. Referring to FIG. 4C, once the desired input torque has been applied to the sleeve/nut combination, each pawl 78 simultaneously enters a corresponding recessed groove 83 adjacent to the starting recessed groove, thereby producing an audible clicking sound indicating that the proper output gripping force has been achieved. That is, in the illustrated embodiment, in order for the audible click to occur, the sleeve/nut/annular ratchet combination must be rotated 30 degrees from the point where the jaws engaged the tool shank (FIG. 4A) in order for the pawls to move from one recessed groove to the next adjacent groove (FIG. 4C).

To open chuck 10, and referring particularly to FIGS. 4A-4C, sleeve 18, and therefore nut 28, are rotated in a direction opposite to direction 88. Because pawls 78 and recessed grooves 83 constrain annular ratchet 80 in the opening direction, ring 80 initially does not move, and tabs 84 therefore move through the sleeve grooves. This slight rotation of nut 28, relative to chuck body 12 causes jaws 26 to retract slightly in passageways 38 and thereby releases the axially rearward force that frictionally retains annular ring flange 76 between bearing washer 62 and thrust ring member 46. As a result, annular ring 74 is once again rotatable with respect to the body. As the user continues to rotate sleeve 18 in the opening direction, tabs 84 abut the sides of the sleeve grooves so that the sleeve again drives annular ratchet 80 and annular ring 74.

If sleeve 18 is thereafter rotated in the closing direction, friction between sleeve 18 and ring 80 hold the sleeve and the ring together in the position they were in when turning the sleeve in the opening direction until the jaws close onto a tool shank. When this event stops rotation of ring 74, pawls 78 hold ratchet ring 80 in position until grooves 86 in the still-rotating sleeve 18 pass over tabs 84. When the following edges of grooves 86 engage tabs 84, the sleeve again drives ring 80, and the chuck operates as discussed above.

Figure 5A:
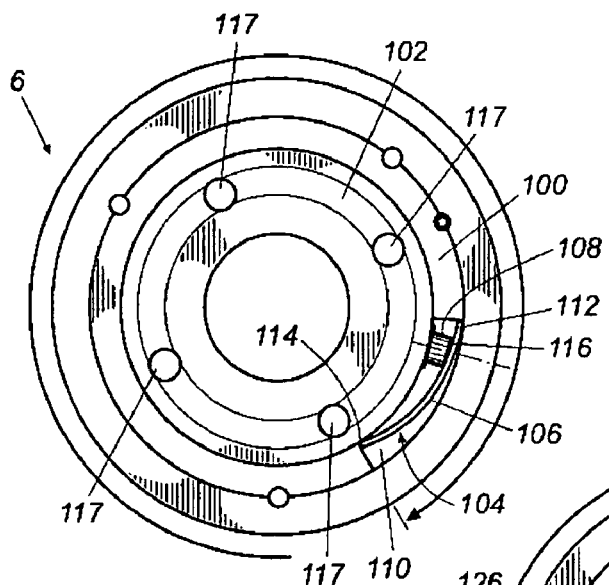
FIGS. 5A-5B are bottom plan views of the spindle lock shown in FIG. 1, the spindle lock being in a unlocked and locked position, respectively.
Figure 5B:
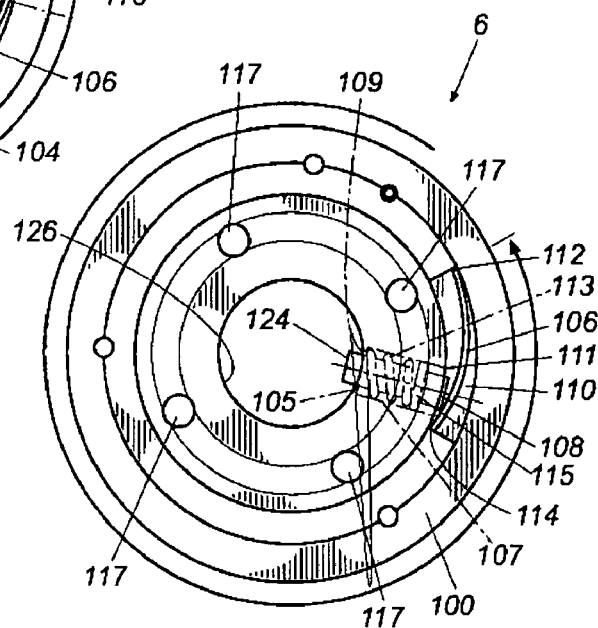

FIGS. 1 and 5A-5D illustrate an embodiment of spindle lock 6, which is used to rotationally lock spindle 4 to driver housing 3. Referring particularly to FIGS. 5A-5B, spindle lock 6 includes an inner annular ring 102 and an outer annular ring 100 that rotates relative to the inner annular ring between an opened first position and a locked second position.

A lock body 104 located intermediate inner and outer annular rings 102 and 100, respectively, includes a cam arm 106 and a spring-loaded button 108. Spring-loaded button 108 is received in a radial bore 107 formed through inner annular ring 102. A countersunk first end 109 of bore 107 defines a ledge 105 that forms a hole through which extends an end 124 of button 108. The hole has a smaller diameter than a diameter of a spring 113 disposed between button 108 and ledge 105. A second side 111 of bore 107 is open so that the bore slidably receives button 108. Spring 113 engages at its opposite end a flange 115 so that spring 113 biases button 108 radially outward of bore 107. Cam arm 106 is fixed in a recessed chamber 110 between a rear corner 112 and a diagonal's opposite front corner 114 so that the cam arm engages an opposite end 116 of spring-loaded button 108.

A lock body is any structure that interlocks two parts together, such as a cammed ball, a spring, a pin, or any other suitable locking device. Four equally spaced blind bores 117 formed in the underside of inner annular ring 102 interact with driver adapter plate 5 (FIG. 1), as explained in further details below.

Figure 5C:
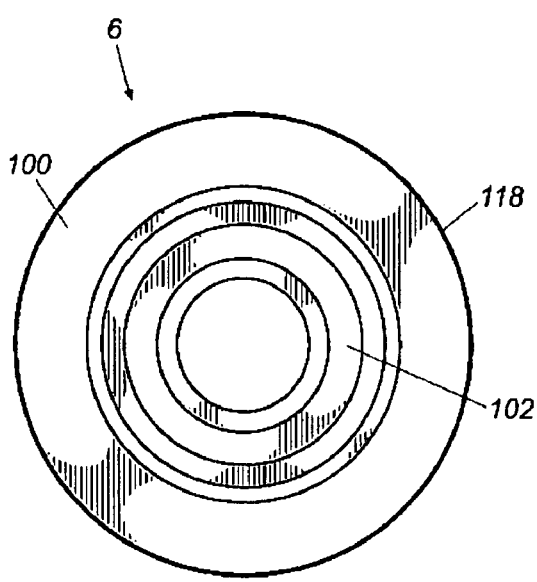
FIG. 5C is a top plan view of the spindle lock shown in FIG. 1.
Figure 5D:
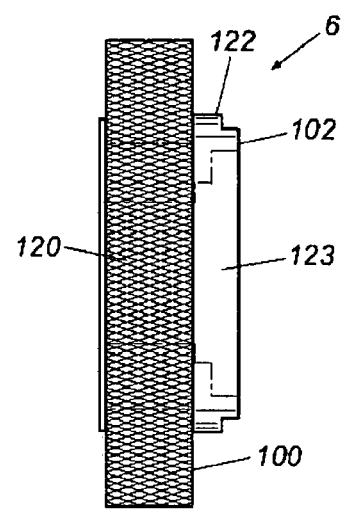
FIG. 5D is a side plan view of the spindle lock shown in FIG. 1.

Referring to FIGS. 5C and 5D, an outer circumference 118 of outer annular ring 100 may be knurled as at 120 to increase the gripability of the outer ring. Inner annular ring 102 defines an axially outwardly stepped portion 122 that is received within and adjacent to the inner circumference of chuck sleeve 18 (FIG. 6) to substantially close off the rear end of sleeve 18 to loose debris during the drilling process. Stepped portion 122 defines an annular recessed portion 123 that receives a flange 25 (FIGS. 1 and 6) formed on body tail section 32.

Referring again to FIGS. 1 and 6, spindle lock 6 is located intermediate driver 2 and chuck 10. Adapter plate 5 is mounted on the forward end of driver housing 3 and is axially and rotationally fixed to the housing by screws 128. Other means of fastening adapter plate 5 to driver 2 may be used, for example rivets, bolts, pins, etc. Alternatively, adapter plate 5 may be integrally formed with housing 3. Adapter plate 5 defines four pins 130 (only three are seen in FIG. 1) equally spaced about spindle 4 and generally parallel to each other and to the chuck center axis 40. Pins 130 are received by inner annular ring blind bores 117, thereby rotationally locking inner annular ring 102 to driver housing 3 through adapter plate 5.

Figure 6:
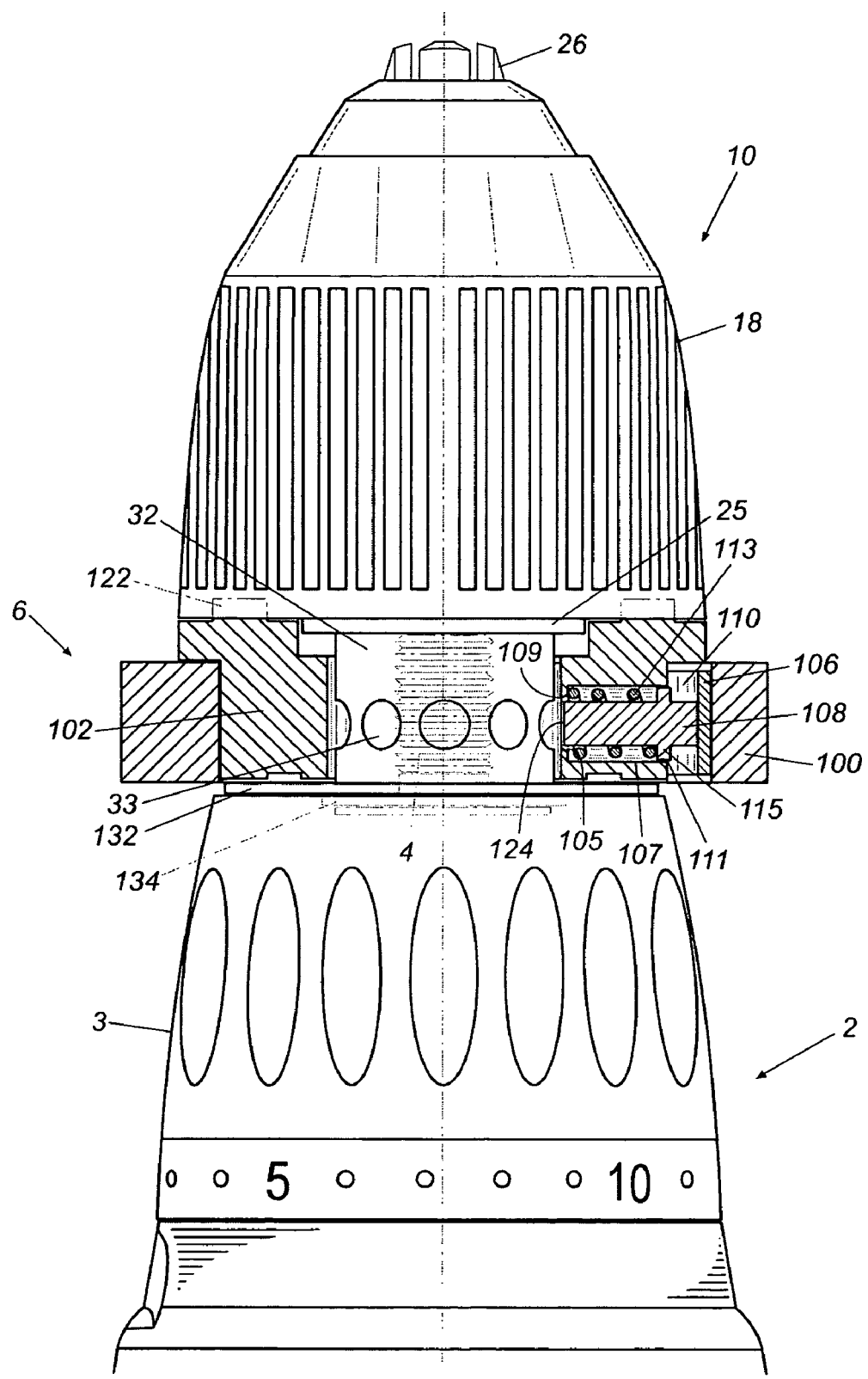
FIG. 6 is a longitudinal view, in partial cross section, of the chuck and spindle lock shown in FIG. 1.

Referring particularly to FIG. 6, spindle lock 6 is received on chuck body tail section 32 so that spring-loaded button 108 aligns with the plurality of equally spaced recesses 33. A circular plate 132 (FIG. 1) is received about the body adjacent to spindle lock 6. A C-clip 134 received in groove 35 (FIG. 1) axially retains plate 132 and spindle lock 6 to chuck 10. It should be understood that while spindle lock 6 is axially retained on the rear of chuck body 12, the spindle lock may rotate relative to the chuck body. Circular plate 132 defines four equally spaced holes 136 that align with blind bores 117 and pins 130. Plate 132 protects the spring loaded button from dirt and debris and retains outer annular ring 100 and inner annular ring 102 on the chuck body through C-Clip 134.

As explained above, chuck 10 is illustrated as a single sleeve chuck that can be opened or closed by rotating nut 28 relative to the chuck body. This can generally be accomplished in one of two ways. First, sleeve 18 can be gripped by a user and the driver actuated so that chuck body 12 rotates relative to nut 28 in either the opening or closing direction. Alternatively, chuck body 12 and spindle 4 can be rotationally fixed to driver housing 3 by spindle lock 6, allowing the user to manually rotate nut 28, via sleeve 18, relative to chuck body 12 using one hand.

Referring again to FIG. 5A, spindle lock 6 is shown in an unlocked position in which cam arm 106 allows spring-loaded button 108 to extend into recessed chamber 110. FIG. 5B illustrates spindle lock 6 in the locked position in which cam arm 106 cams spring-loaded button 108 radially inward so that button end 124 extends through an inner circumference 126 of inner annular ring 102. Thus, to engage the spindle lock, the user rotates annular outer ring 100 relative to annular inner ring 102 so that cam arm 106 biases spring-loaded button 108 radially inward. Outer annular ring 100 rotates relative to inner annular ring 102 since the inner annular ring is rotationally coupled to driver housing 3 by adapter plate 5. Additionally, outer annular ring 100 rotates relative to chuck body 12 since spindle lock 6 is mounted such that it is axially fixed but rotatable about the chuck body.

As spring-loaded button 108 is forced radially inward toward recesses 33 by cam 106, button end 124 begins to protrude through circumference 126 toward body tail section 32 (FIG. 1). Depending on the alignment of recesses 33 and button end 124, the button may engage one of recesses 33 or may abut the outer surface of the chuck body between a pair of recesses 33. If the latter occurs, the user may slightly rotate chuck body 12 by rotating sleeve 18 until button second end 124 aligns with one of recesses 33. The chuck body will rotate with sleeve 18 through frictional forces between the chuck parts. Once one of recesses 33 align with the button end, the user may further rotate annular outer ring 100 into the locked second position. The user can determine when the recess aligns with the button end by applying slight rotational force to annular outer ring 100 with one hand as chuck sleeve 18 is rotated with the other hand so that the button end moves into the recess when it aligns with the button. Once in the locked second position, the spring-loaded button rotationally couples the chuck body/spindle to the driver housing through adapter plate 5 and recesses 33. As a result, the user may rotate chuck sleeve 18 in the opening or closing direction relative to the chuck body to retract or close jaws 26.

Once the jaws are sufficiently opened, a tool shank may be inserted, and sleeve 18 may be rotated in the opposite or closing direction 88 (FIG. 3). As explained above, once the jaws clamp onto the tool shank, sleeve 18 can be further rotated in the closing direction until an audible click is heard, which indicates that the chuck is properly closed. Before operating the chuck, the user rotates annular outer ring 100 relative to inner annular ring 102 toward the opened first position (FIG. 5B) so that rear corner 112 of chamber 110 moves toward button 108 and so that cam arm 106 allows button 108 to move radially outward from one of recesses 33 under the bias of spring 113 until button end 116 is again received in chamber 110. In this position, the spindle/chuck body may rotate freely relative to the driver housing.

Figure 7:
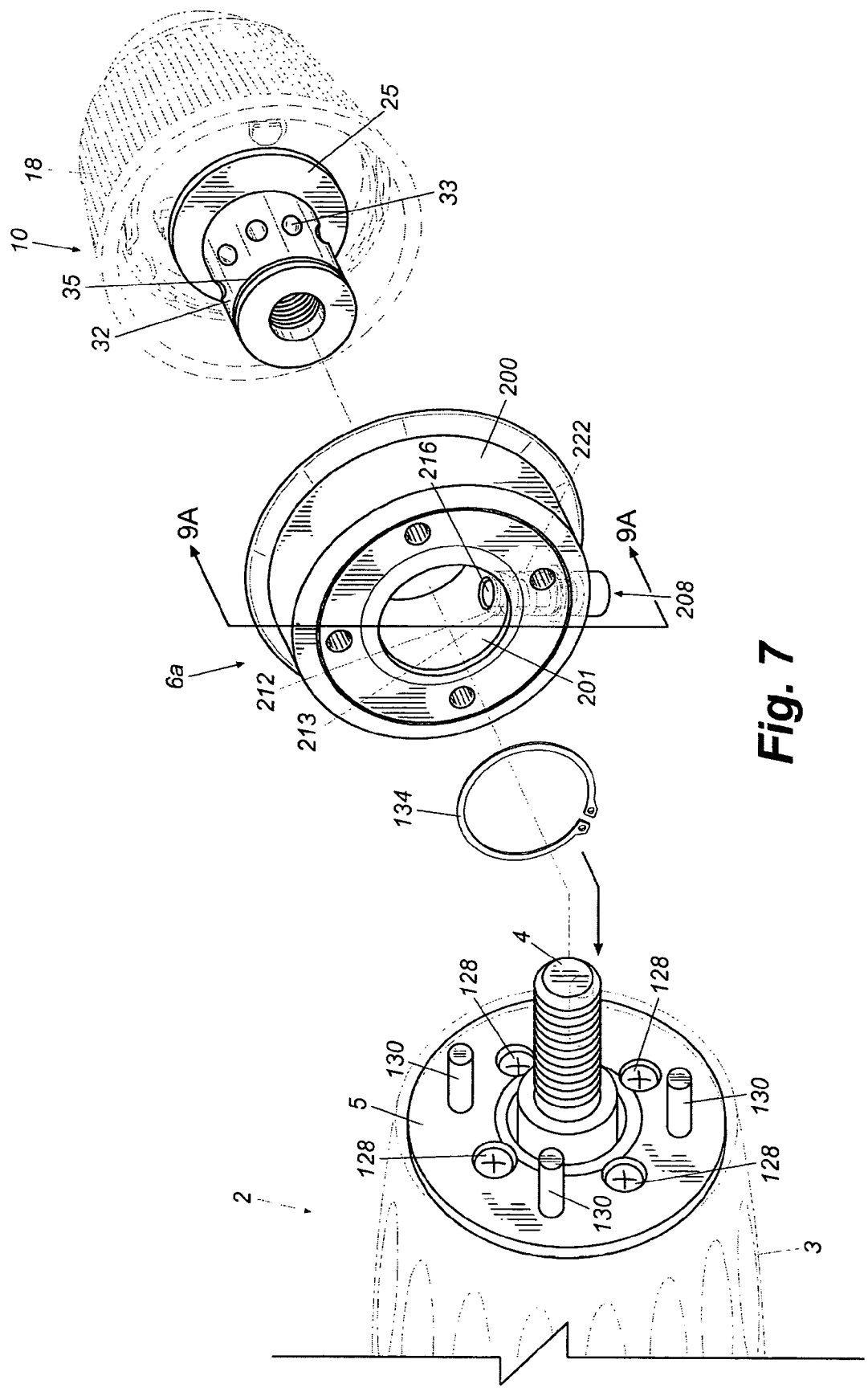
FIG. 7 is an exploded view of a chuck and spindle lock in accordance with an embodiment of the present invention.

In a further embodiment shown in FIG. 7, a spindle lock 6a has an annular body 200 that defines an axial hole 201 sized to receive a portion of body tail section 32 similarly to the spindle lock shown in FIG. 1. Spindle lock 6a is received on body tail section 32 so that a spring-loaded button 208 axially aligns with the plurality of equally spaced recesses 33. Spindle lock 6a is axially fixed to chuck 10 by a C-clip 134 received in body groove 35.

Figure 8A:
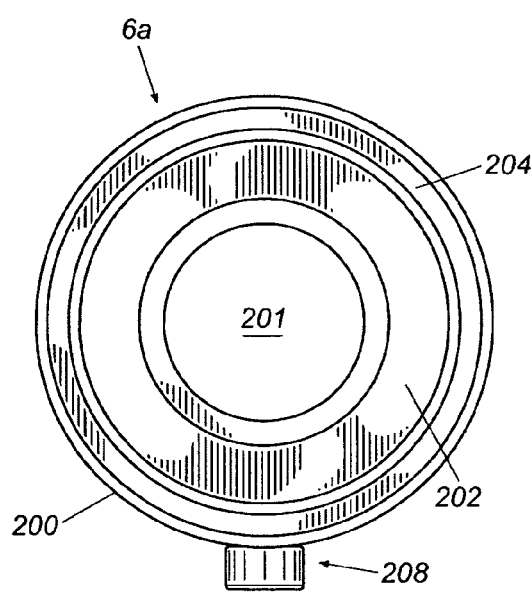
FIG. 8A is a top plan view of the spindle lock shown in FIG. 7.
Figure 8B:
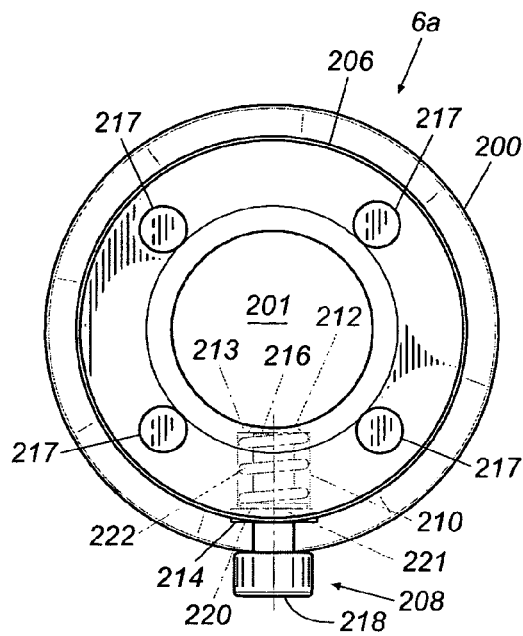
FIG. 8B is a bottom plan view of the spindle lock shown in FIG. 7.
Figure 8C:
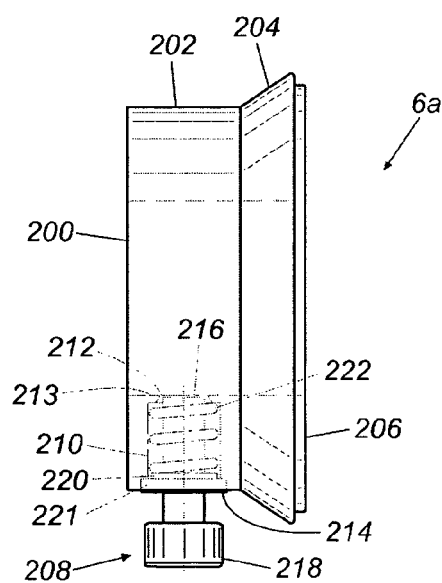
FIGS. 8C-8D are side plan views of the spindle lock of FIG. 7, the spindle lock being in a unlocked and locked position, respectively.
Figure 8D:
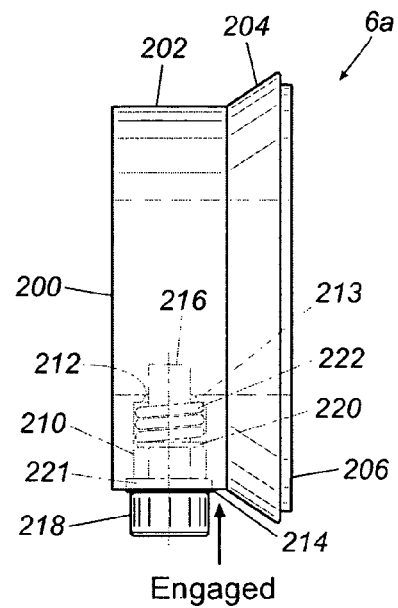
Figure 9A:
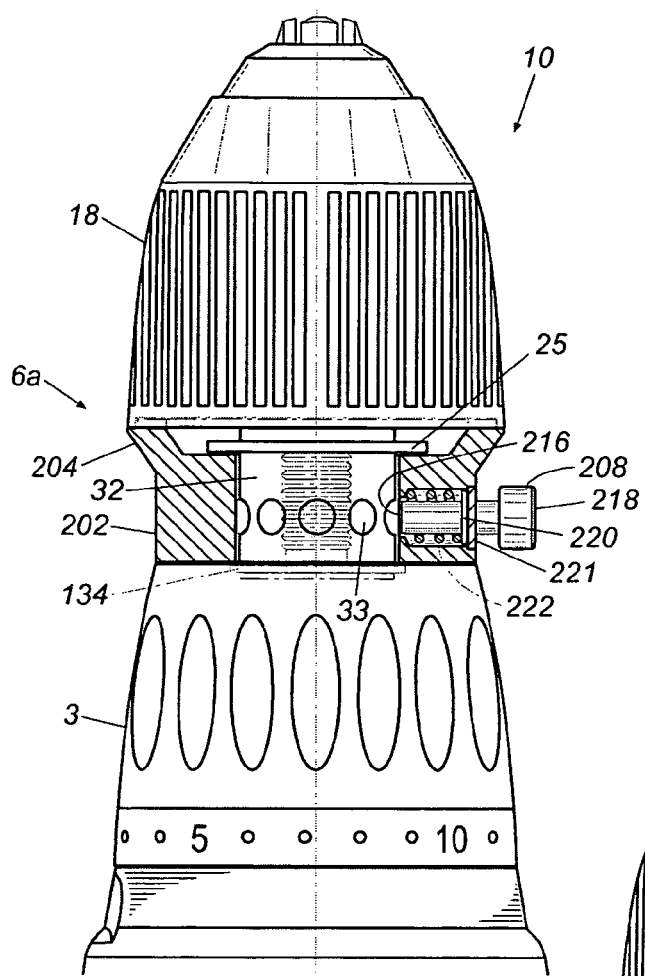
FIG. 9A is a longitudinal view, in partial cross section, of the chuck and spindle lock shown in FIG. 7 in which the spindle lock is in the unlocked position.
Figure 9B:
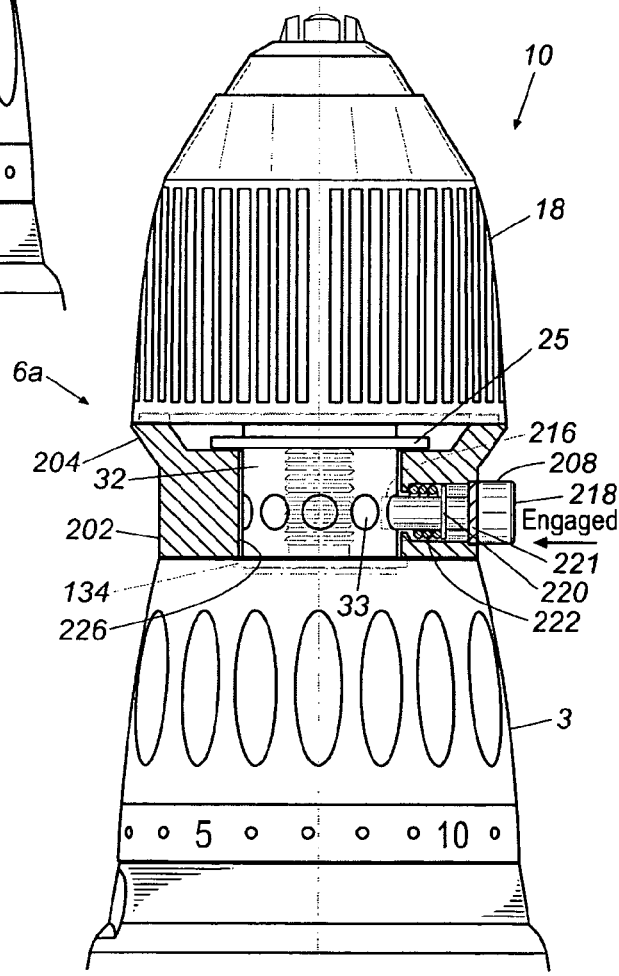
FIG. 9B is a longitudinal view, in partial cross section, of the chuck and spindle lock shown in FIG. 7 in which the spindle lock is in the locked position.

Referring to FIGS. 8A-8D, body 200 has a first generally cylindrical portion 202 and a second frustoconical portion 204 that defines an axially extending flange 206 sized to fit within the inner circumference of chuck sleeve 18 (FIGS. 9A-9B). Generally, cylindrical first portion 202 defines four equally spaced blind bores 217 that receive adapter plate pins 130. First generally cylindrical portion 202 defines a radially extending bore 210 that receives a spring-loaded button 208. Radially extending bore 210 has a first end 212 having an inwardly extending ledge 213 that defines an aperture having a smaller diameter than a second end 214 of bore 210.

Spring-loaded button 208 has a first end 216, a second end 218, and a first fixed annular flange 220 intermediate the first and second ends. A spring 222 is received between button first end 216 and button first annular flange 220. An axially moveable (relative to button 208) second annular flange 221 is located between button first annular flange 220 and button second end 218. A diameter of button second annular flange 221 is slightly larger than the diameter of bore second end 214 so that button second annular flange 221 can be press-fitted in the bore second end. The diameter of bore first end 212 is slightly larger than the diameter of button first end 216 and slightly smaller than the diameter of spring 222 so that spring 222 abuts inwardly extending ledge 213. Thus, spring 222 biases the button radially outward away from ledge 213.

Referring particularly to FIGS. 8C-8D, spring-loaded button 208 is moveable between a first position (FIG. 8C) at which button 208 is biased radially outward so that its first end 216 is flush with or outward of the inner diameter of center hole 201, and a second position (FIG. 8D) where button first end 216 extends radially inward into aperture 201. Button 208 is moveable between the first and second positions but is biased toward the first position by spring 222. Thus, button 208 is naturally biased to the unlocked position.

Referring to FIG. 9A, spindle lock 6 is shown in the unlocked position at which spring 222 biases button first end 216 radially outward away from recesses 33. FIG. 9B illustrates spindle lock 6A in the locked position where the user presses spring-loaded button 208 radially inward so that button second end 216 extends through inner circumference 226 into one of recesses 33. As spring-loaded button 208 is forced radially inward, its second end 216 begins to protrude through circumference 226 into engagement with body tail section 32.

Depending on the alignment of recesses 33 and button second end 216, the button may engage a recess or may abut the outer surface of the chuck body. If the latter occurs, the user slightly rotates chuck 10 by rotating sleeve 18 with one hand until button second end 216 aligns with one of recesses 33 and further depresses button 208 with the other hand. Applying slight pressure to button 208 as sleeve 18 is rotated allows button end 216 to enter one of the recesses when the button end aligns with the recess.

Once in the locked position, the spring-loaded button rotationally couples the chuck body/spindle to the driver housing through adapter plate 5. In this configuration, the user may rotate chuck sleeve 18 in the opening or closing direction to open or close the chuck since the chuck body/spindle is rotationally locked to the driver housing through spindle lock 6. That is, body 200 is rotationally locked to driver housing 3 by adapter plate 5, and chuck body 12 is rotationally locked to body 200 by the engagement of button 208 and recesses 33.

Spindle lock 6a differs from spindle lock 6 (FIG. 1) in that the user holds button 208 in the locked position during the opening or closing of the chuck. Thus, if the button is released, spring 222 biases button 208 to the unlocked position. The operation of chuck 10 is the same as that described for the embodiment shown in FIG. 6 and is therefore not repeated herein.

Figure 10:
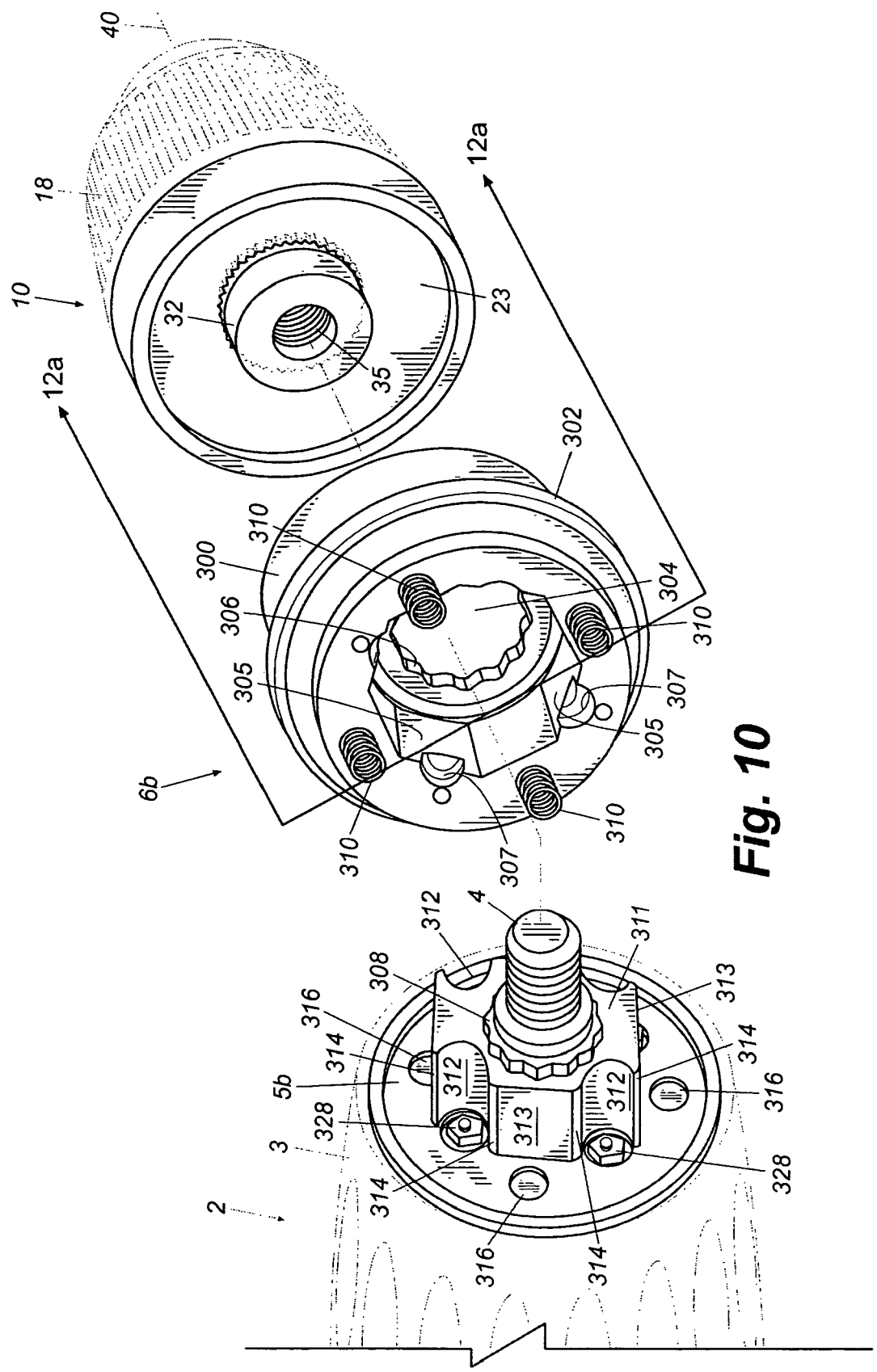
FIG. 10 is an exploded view of a chuck and spindle lock in accordance with an embodiment of the present invention.
Figure 11A:
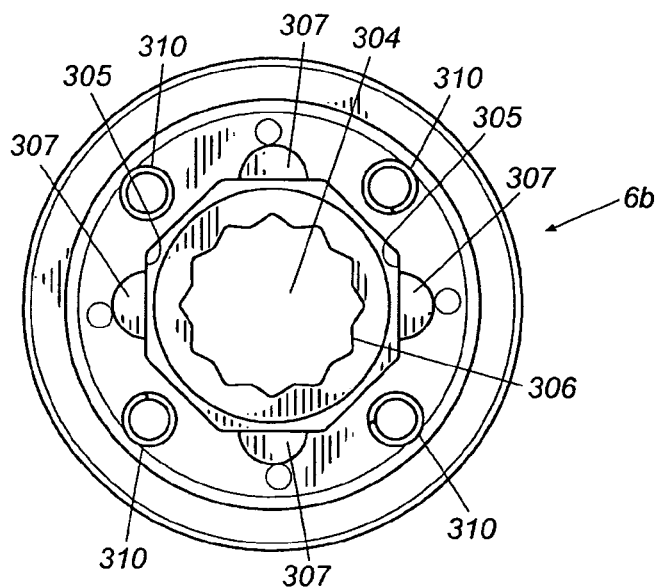
FIG. 11A is a bottom plan view of the spindle lock shown in FIG. 10.
Figure 11B:
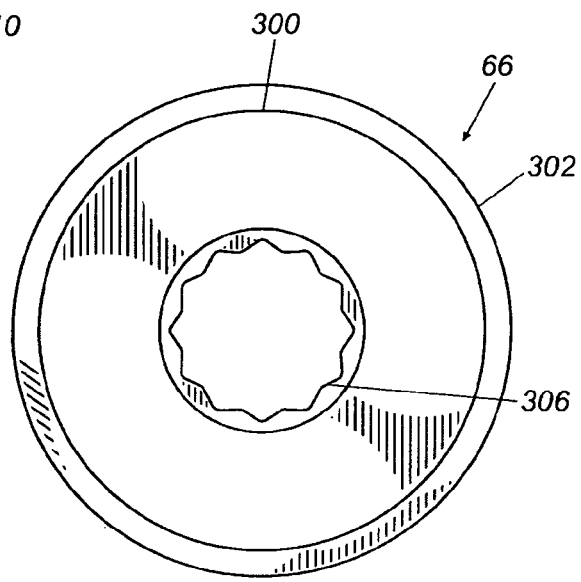
FIG. 11B is a top plan view of the spindle lock shown in FIG. 10.
Figure 11C:
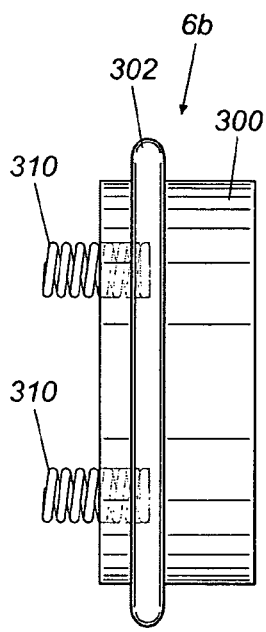
FIG. 11C is side plan view of the spindle lock of FIG. 10.

Referring to FIG. 10, spindle lock 6b has an annular body 300 having an annular flange 302 on an outer circumference thereof and a polygonally shaped bore 304 therethrough. Polygonally shaped bore 304 is bounded by a plurality of flat wall sections 305 and is sized to receive a portion of body tail section 32. Four curved recesses 307 extend radially outward into body 300 at respective alternating walls 305. Polygonally shaped bore 304 terminates in a polygonally shaped aperture 306 that is sized and shaped to matingly receive a correspondingly polygonally shaped flange 308 formed on driver spindle 4. Polygonal flange 308 is both axially and rotationally fixed to spindle 4 and may be integrally formed with the spindle. Four springs 310 extend axially rearward from body 300 and are generally parallel to each other and chuck axis 40.

Adapter plate 5b is received on the forward end of driver housing 3 and is axially and rotationally fixed to housing 3 by nuts 328. Other means of fastening adapter plate 5b to housing 3 may be used, for example rivets, screws, pins, etc. Alternatively, adapter plate 5b may be integrally formed with housing 3. Adapter plate 5b has a polygonal extension 311 having sidewalls 313 and arcuate recesses 312 formed between sidewalls 313 that receive respective nuts 328. Side edges 314 of circular recesses 312 are chamfered so that the edges of a given recess lie on a common plane. Thus, chamfered edges 314 and sidewalls 313 define the polygonal shape of the extension. Adapter plate 5b also defines four equally spaced blind bores 316 adjacent to sidewalls 313 that receive the ends of respective springs 310. Spindle 4 extends axially through polygonal extension 311 and rotates relative to the extension.

Figure 12A:
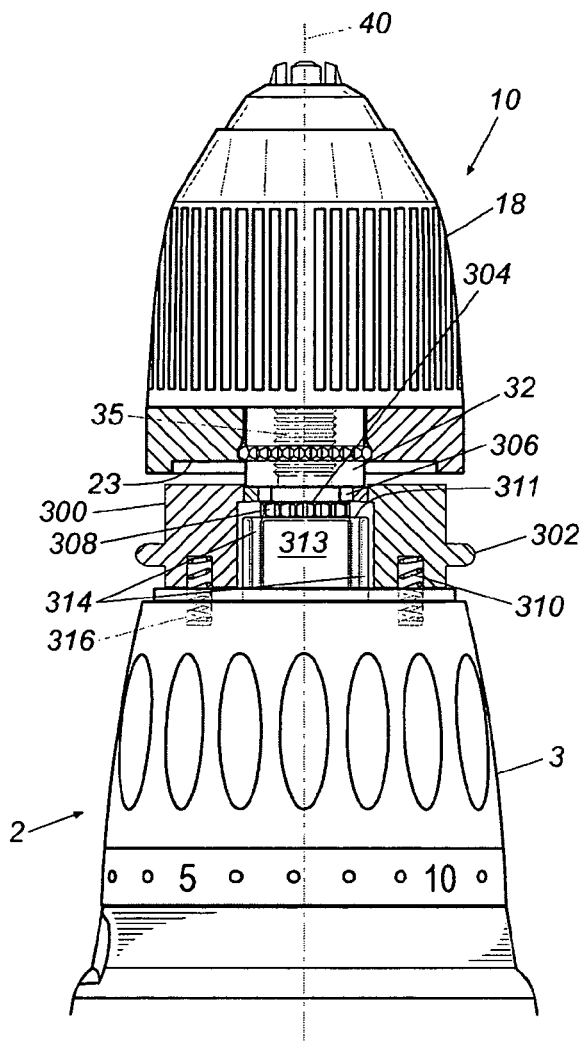
FIG. 12A is a longitudinal view, in partial cross section, of the chuck and spindle lock shown in FIG. 10 in which the spindle lock is in the unlocked position.
Figure 12B:
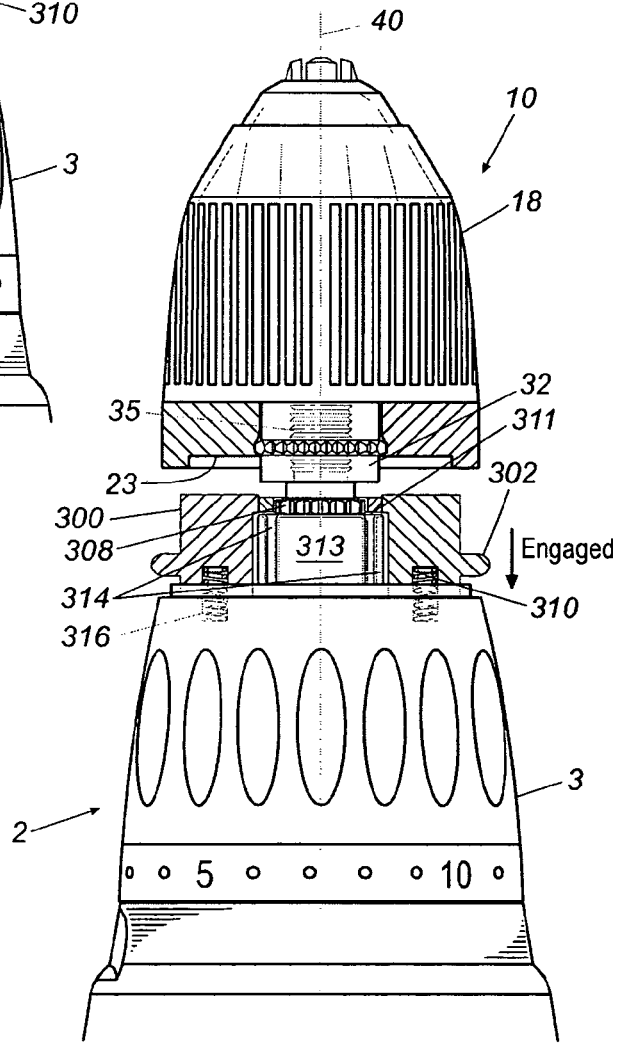
FIG. 12B is a longitudinal view, in partial cross section, of the chuck and spindle lock shown in FIG. 10 in which the spindle lock is in the locked position.

Referring to FIGS. 10, 12A and 12B, spindle lock 6b is disposed between chuck 10 and adapter plate 5b such that (1) springs 310 are received in respective blind bores 316, (2) polygonally shaped bore 304 receives correspondingly polygonally shaped extension 311, thereby rotationally fixing spindle lock 6b to driver housing 3, and (3) curved wall recesses 307 align with arcuate recesses 312 over respective nuts 328.

In operation, spindle lock 6b is moveable between a first unlocked position (FIG. 12A) and a second locked position (FIG. 12B). In the unlocked position, springs 310 axially bias annular body 300 forward and away from driver housing 3 so that polygonally shaped aperture 306 disengages from polygonally shaped flange 308, thereby allowing spindle 4 to rotate freely with respect to the driver housing. To move spindle lock 6b to the locked position, the user grasps body 300 by flange 302 and pulls it axially rearward toward driver housing 3 against the bias of spring 310 so that polygonally shaped bore 306 receives polygonally shaped flange 308 thereby locking spindle 4 to driver housing 3. In the locked position, the user can rotate the sleeve and nut relative to the chuck body/spindle to open or close the chuck depending on the direction of rotation.

Spindle body 300 is rotationally fixed to driver housing 3 at all times. That is, polygonally shaped extension 311 is always received in polygonally shaped bore 304 whether in the locked or unlocked position so that spindle body 300 is rotationally fixed but axially moveable with respect to driver housing 3. Moreover, spindle lock 6b is naturally biased to the unlocked position by springs 310 so as not to interfere with the general operation of the chuck.

Figure 13:
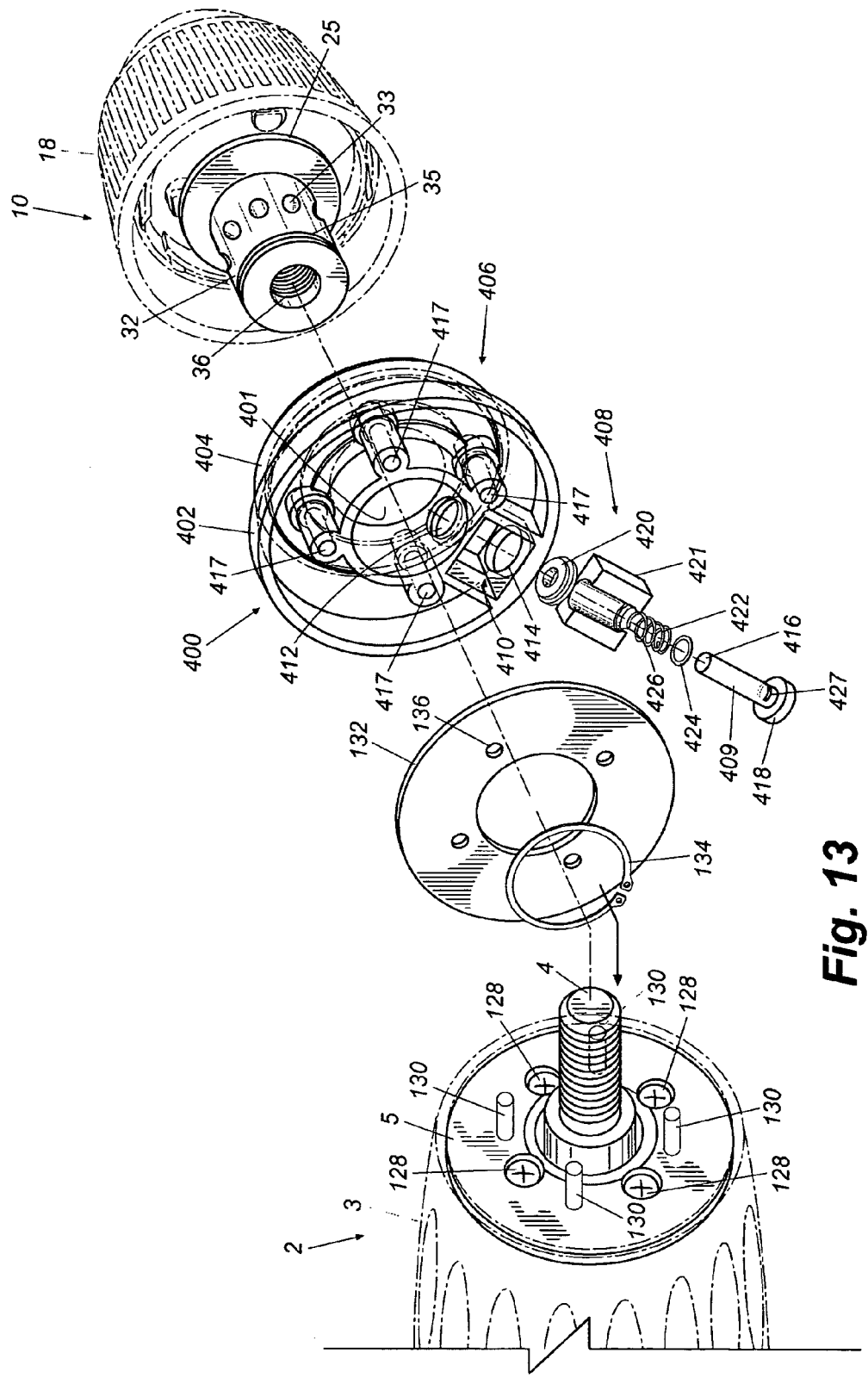
FIG. 13 is an exploded view of a chuck and spindle lock in accordance with an embodiment of the present invention.
Figure 14A:
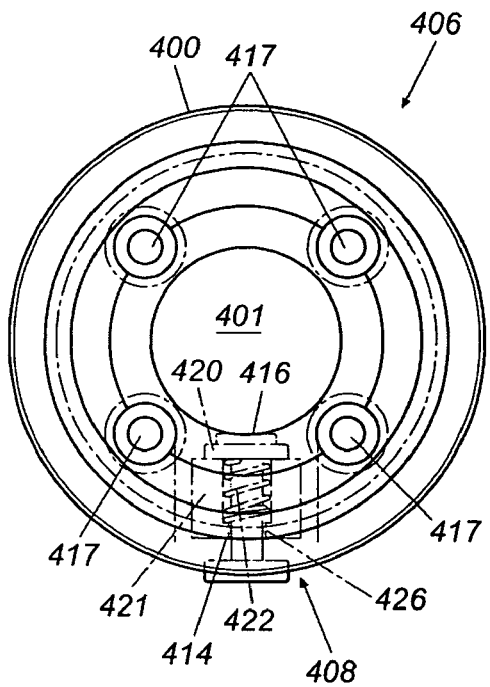
FIG. 14A is a top plan view of the spindle lock of FIG. 13.
Figure 14B:
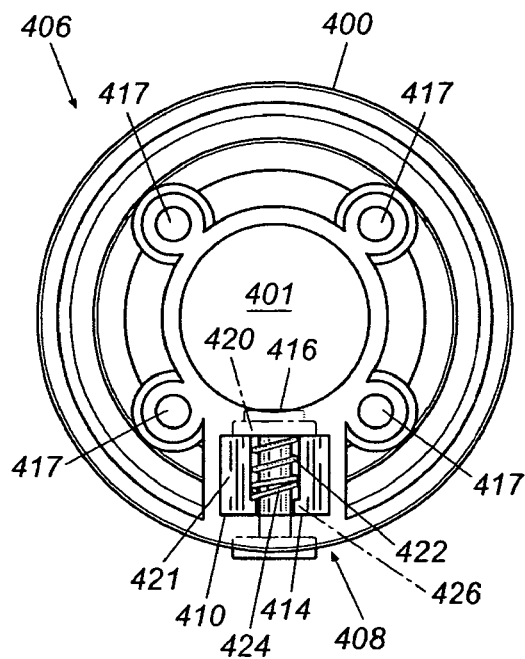
FIG. 14B is a bottom plan view of the spindle lock shown in FIG. 13.
Figure 14C:
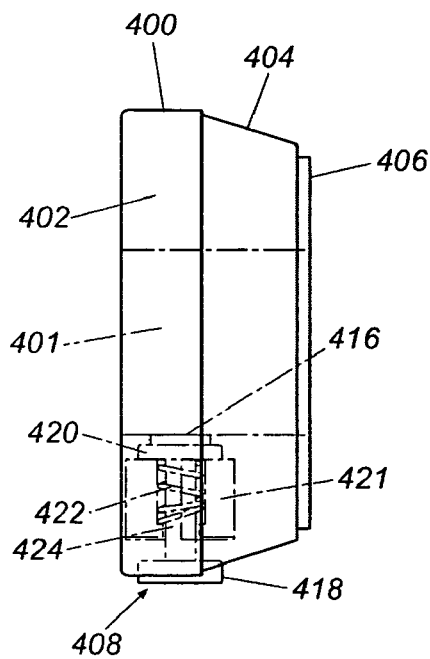
FIGS. 14C-14D are side plan views of the spindle lock of FIG. 13, the spindle lock being in a unlocked and locked position, respectively.
Figure 14D:
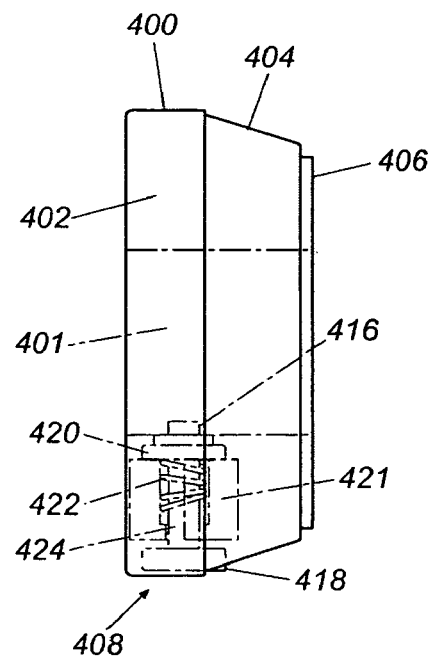

In a further embodiment shown in FIGS. 13-14D, a spindle lock 406 is received intermediate driver 2 and chuck 10. Spindle lock 406 has an annular body 400 that defines an axial hole 401 sized to receive a portion of chuck body tail section 32 and that is axially fixed to chuck 10 by a C-clip 134 received in body groove 35 (FIG. 13). Body 400 defines four equally spaced bores 417 that receive adapter plate pins 130 to rotationally fix the spindle lock to driver 2. In the alternative, body 400 may also be rotationally secured directly to the front of driver housing 3 by removing adapter plate 5 and placing a plurality of screws (not shown) through respective bores 417 into holes formed in the front of driver housing 3. In either case, the spindle lock is received about body tail section 32 so that a spring-loaded button 408 axially aligns with the plurality of equally spaced recesses 33, thereby allowing the spindle lock to rotationally fix the chuck body to the driver housing.

Body 400 has a first generally cylindrical portion 402 and a second frustoconical portion 404 that defines an axially extending flange 406 (FIGS. 14C-14D), which is sized to fit within the inner circumference of chuck sleeve 18, similar to that shown in FIG. 9A. Body portion 402 also has an axially extending blind bore 410 that has a first end defining an aperture 412 and a second end defining an aperture 414. Bore 410 receives spring loaded button 408 that engages recesses 33.

Spring-loaded button 408 includes a button 409 having a first end 416, a second end 418, a first washer 420 proximate button first end 416, a second washer 424 proximate button end 418 and a square housing 421 that receives the button, washer 424 and a spring 422 received intermediate button washers 420 and 424 about button 409. Referring to FIGS. 14A-14B, first washer 420 is received in aperture 412 and receives button first end 416 therethrough, and second washer 424 is received adjacent an inward facing ledge 426 of housing 421 so that a groove 427 (FIG. 13) formed proximate button second 418 is radially inward of washer 424. In this position, button 418 extends radially out of aperture 414 so that it can be manually depressed by a user. Button 409 is radially retained in housing 421 by a portion of spring 422 that is received in button groove 427 so that the spring abuts washer 424, which stops the button from moving radially outward of housing 421. A diameter of spring 422 is slightly larger than a diameter of button first end 416 and the center hole of washer 420. Thus, spring 422 abuts washer 420 and biases the button radially outward so that the opposite side of the spring abuts second washer 424.

Referring particularly to FIGS. 14C-14D, spring-loaded button 408 is moveable between a first position (FIG. 14C) at which button 408 is biased radially outward so that its first end 416 is flush with or outward of the inner diameter of center hole 401, and a second position (FIG. 14D) where button first end 416 extends radially inward into aperture 401. Button 408 is moveable between the first and second positions but is biased toward the first position by spring 422. Thus, button 408 is naturally biased to the unlocked position. The general operation of spindle lock 406 and interaction with chuck 10 and driver 2 is similar to that of spindle lock 6a shown in FIGS. 9A-9B and will not be repeated herein.

Figure 15:
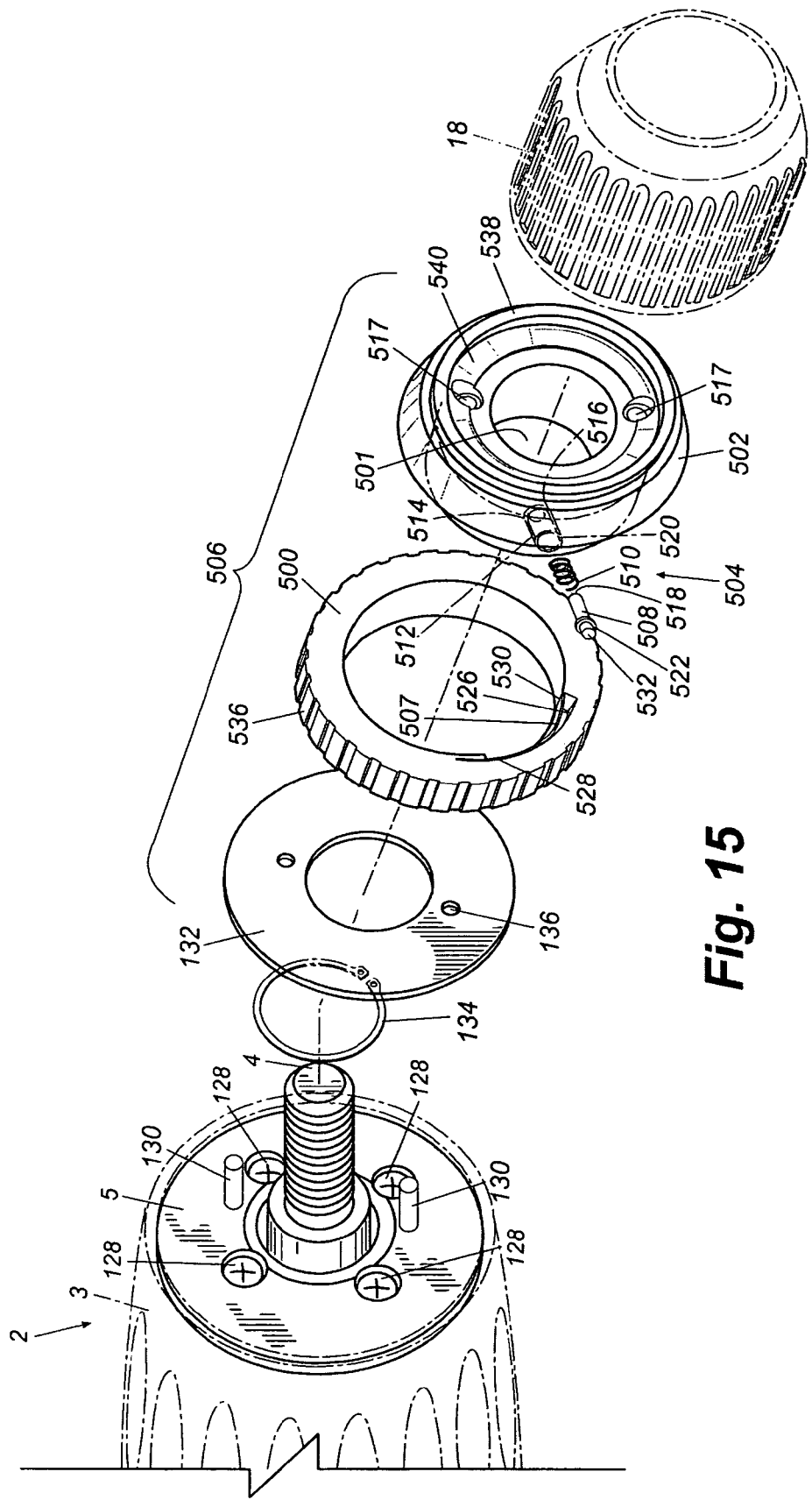
FIG. 15 is an exploded view of a chuck and spindle lock in accordance with an embodiment of the present invention.
Figure 16A:
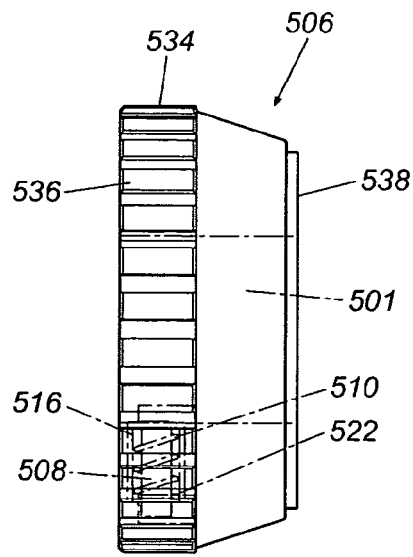
FIG. 16A is a side plan view of the spindle lock shown in FIG. 15.
Figure 16B:
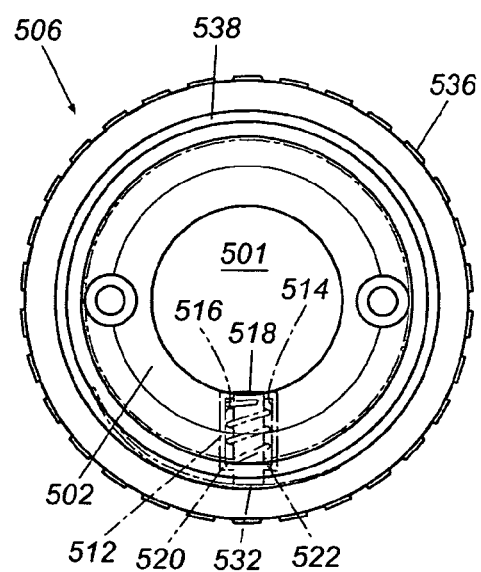
FIG. 16B is a top plan view of the spindle lock shown in FIG. 15.
Figure 16C:
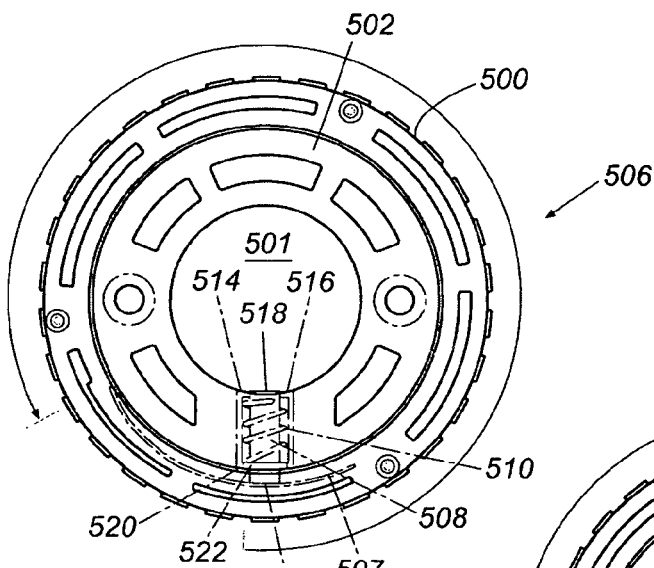
FIGS. 16C-16D are bottom plan views of the spindle lock of FIG. 15, the spindle lock being in a unlocked and locked position, respectively.
Figure 16D:
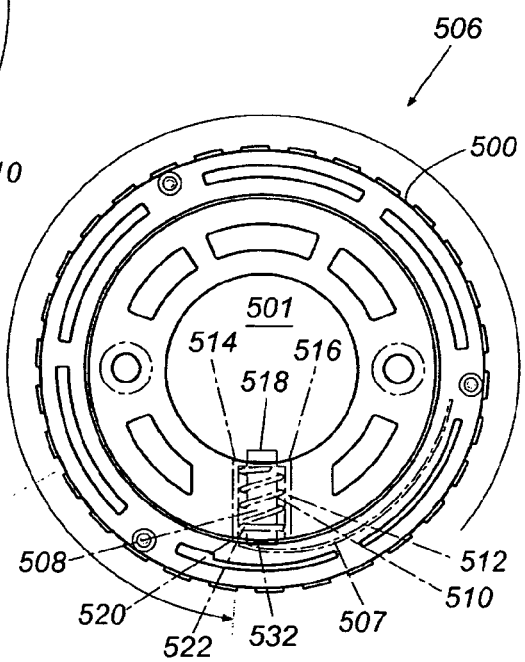

FIGS. 15-16D illustrate yet another embodiment of a spindle lock 506, which is used to rotationally lock spindle 4 to driver housing 3. Referring particularly to FIGS. 15-16B, spindle lock 506 includes an inner annular ring 502 and an outer annular ring 500 that rotates relative to the inner annular ring between an opened first position and a locked second position.

An outer circumference 534 of outer annular ring 500 may be knurled as at 536 to increase the gripability of the outer ring. Inner annular ring 502 defines an axially outwardly stepped portion 538 that is received within and adjacent to the inner circumference of chuck sleeve 18 to substantially close off the rear end of sleeve 18 to loose debris during the drilling process. Stepped portion 538 defines an annular recessed portion 540 that receives a flange (not shown) formed on body tail section 32, similar to the chuck embodiment of FIGS. 1 and 6.

A lock body 504 located intermediate inner and outer annular rings 502 and 500 includes a cam 507, a button 508 and a spring 510. Button 508 is received in a radial bore 512 formed through inner annular ring 502. A first end 514 of bore 512 defines a ledge 516 that forms a hole through which extends an end 518 of button 508. The hole has a smaller diameter than a diameter of spring 510 disposed between button 508 and ledge 516. A second side 520 of bore 512 is open so that the bore slidably receives button 508. Spring 510 engages at its opposite end a flange 522 so that spring 510 biases button 508 radially outward of bore 512. Cam arm 507 is fixed in a recessed chamber 526 between a rear corner 528 and a opposite front corner 530 so that the cam arm engages an opposite end 532 of spring-loaded button 508. Two equally spaced bores 517 are formed in the underside of inner annular ring 502 that interact with driver adapter plate 5, similar to the embodiment illustrated in FIGS. 1-6.

It should be understood that the walls of chamber 526 can act as the cam arm 507 instead of a separate piece received in a recessed chamber. That is, the chamber may be dimensioned such that the wall acts directly on button end 532 to move it radially inward as outer annular ring 500 is moved relative to inner annular ring 502. Moreover, inner annular ring 502 can be directly fastened to the front of driver housing 3 by screws (not shown) received through bores 517 in holes formed in the front end of driver housing 3 (not shown). In this configuration, adapter plate 5 would be eliminated since spindle lock 506 would be directly connected to the driver housing.

Referring to FIGS. 16C and 16D, spindle lock 506 is moveable between a first position (FIG. 16C) at which pin 508 is in an unlocked position so that button end 518 is radially outward of a bore 501 defined by inner annular ring 502, and a second position (FIG. 16D) wherein button end 518 is biased radially inward into bore 501 by cam arm 507 through rotation of outer annular ring 500 relative to inner annular ring 502. The location and operation of spindle lock 506 is similar to the spindle lock described above and illustrated in FIGS. 1 and 6. Thus, a detailed description is not repeated herein.

Figure 17:
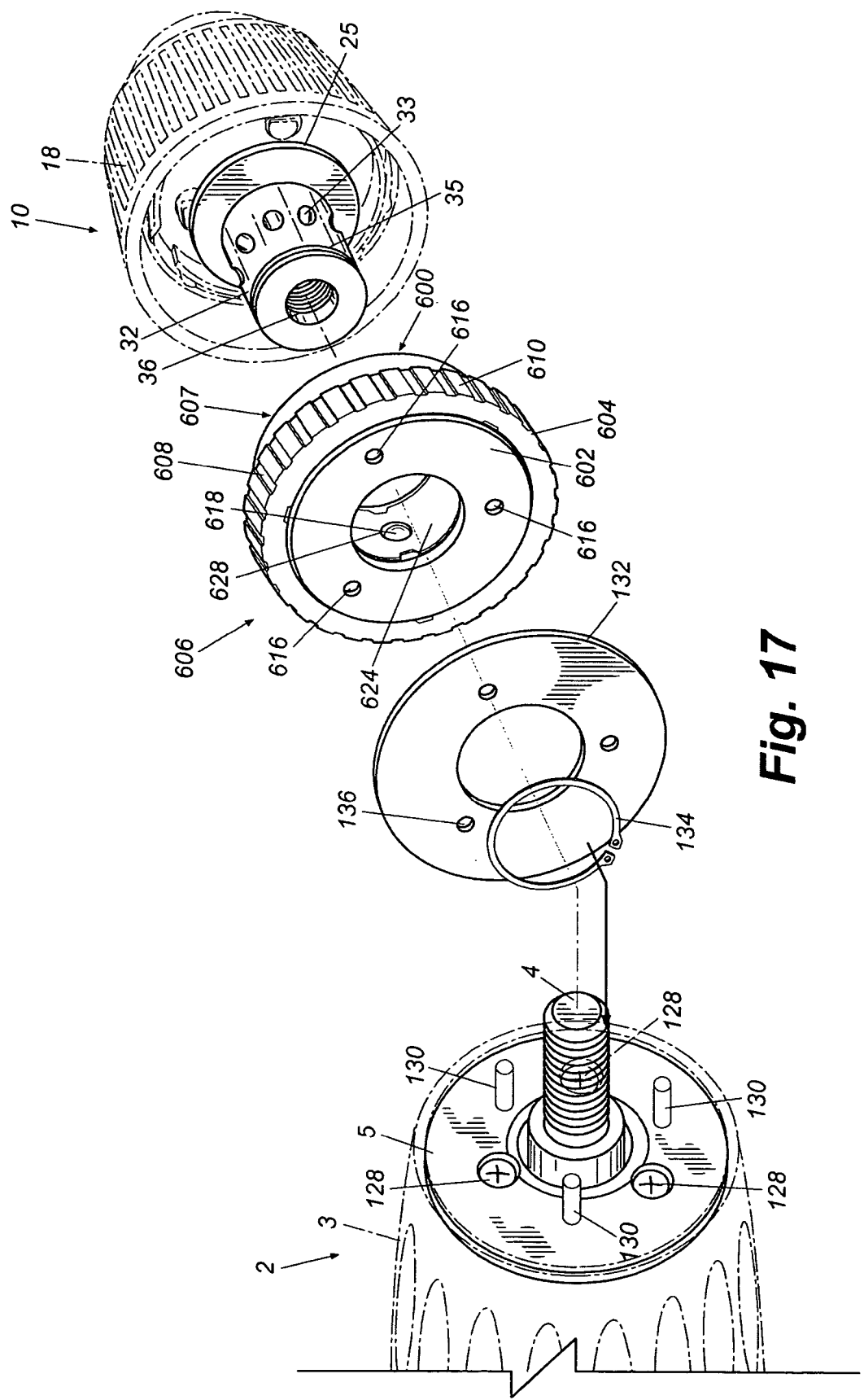
FIG. 17 is an exploded view of a chuck and spindle lock in accordance with an embodiment of the present invention.
Figure 18D:
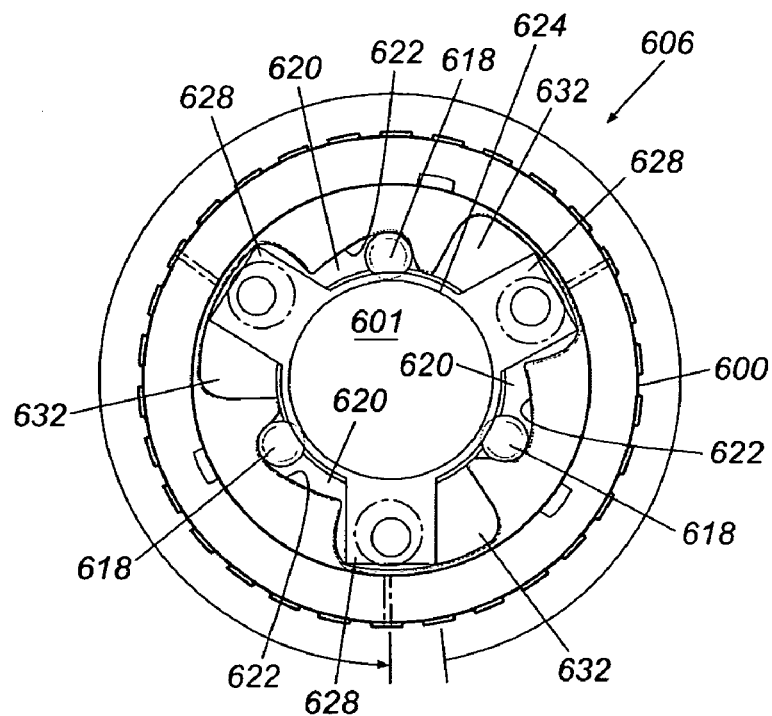
FIGS. 18D-18E are bottom plan views of the spindle lock of FIG. 18A with the back cover removed, the spindle lock being in a unlocked and locked position, respectively.
Figure 18E:
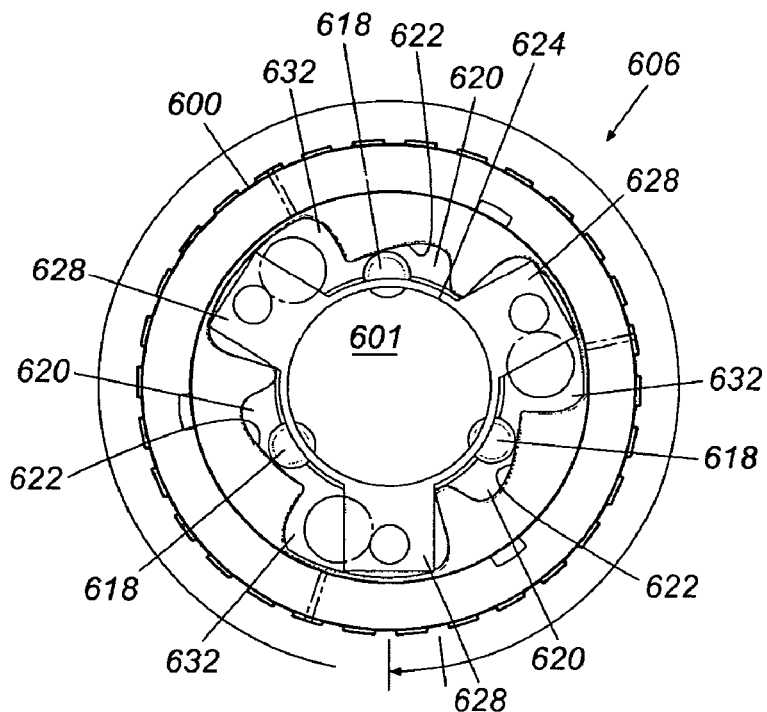

In yet another embodiment of a spindle lock shown in FIGS. 17-18E, spindle lock 606 has an annular collar 600 and a back cover 602 that rotates relative to annular collar 600 between an opened first position and a locked second position. The back cover may be secured to annular collar 600 by a plurality of pins 603 received through back cover 602 and in respective annular slots 605 formed in an outer circumference of back cover 602.

Referring particularly to FIG. 18A-18B, annular collar 600 has a cylindrical rear portion 604 and a frustoconical front portion 607. An outer circumference 608 of annular collar 600 may be knurled as at 610 to increase the gripability of the outer ring. Frustoconical front portion 607 defines an axially outwardly stepped portion 612 (FIG. 18B) that is received within and adjacent to the inner circumference of chuck sleeve 18 to substantially close off the rear end of sleeve 18 to loose debris during the drilling process. Stepped portion 612 defines an annular recessed portion 614 that receives a flange 25 (FIG. 17) formed on body tail section 32, similar to the chuck embodiment of FIGS. 1 and 6. Moreover, three equally spaced blind bores 616 are formed in the underside of back cover 602 that interact with driver adapter plate 5 (FIG. 17) through pins 130, similar to the embodiment illustrated in FIGS. 1-6.

Referring again to FIG. 18A, a plurality of lock bodies 618, which may be in the form of balls, are operatively received intermediate annular collar 600 and back cover 602 in recessed portions 620 that define respective cam surfaces 622. Annular collar 600 receives a generally cylindrical bracket 624 in a recess 625 and includes a cylindrical body 626 and a plurality of radially extending flanges 629. Cylindrical bracket body 626 defines a plurality of apertures 628 annularly spaced about the body so that lock bodies 618 are partially received though the apertures. More specifically, the diameter of each lock body 618 is larger than the diameter of its respective aperture 628 such that only a portion of the lock body extends through the aperture. Each lock body 618 is received in recess 620 and is received through aperture 628, as shown in FIG. 18C. Thus, rotation of cylindrical bracket 624 relative to annular collar 600 causes cam surfaces 622 to bias lock bodies 618 radially inward through aperture 628. As the lock bodies move radially inward, each engages a respective recess 33 formed on chuck tail portion 32, thereby rotationally locking chuck body 32 and spindle 4 to driver housing 3.

Cylindrical bracket 624 is rotationally fixed to back cover 602 through flanges 629. More specifically, each flange 629 defines a bore 630 therethrough that aligns with a respective bore 616 in back cover 602. Thus, as spindle lock 606 is placed adjacent to driver housing 3, pins 130 on adapter plate 5 (FIG. 17) pass through respective pairs of bores 616, 630 thereby rotationally fixing back cover 602 and cylindrical bracket 624 to driver housing 3. In such a configuration, rotation of annular collar 600 in a clockwise direction, in the perspective as shown in FIG. 18C, causes cam surfaces 622 to bias lock bodies 618 radially inward through apertures 628. The amount of annular rotation between cylindrical bracket 624 and annular collar 600 is limited by the widths of recesses 632 formed in annular collar 600, which receive bracket flanges 629 and provide annular stops for the bracket flanges.

Referring to FIGS. 18D and 18E, spindle lock 606 is moveable between a first position (FIG. 18D) at which lock bodies 618 are in an unlocked position (so that the lock bodies are radially outward of a bore 601 defined by annular collar 600) and a second position (FIG. 16D) wherein lock bodies 618 are biased radially inward into bore 601 by cam surfaces 622 through rotation of annular collar 600 clockwise (as shown in FIG. 18E) relative to back cover 602 and cylindrical bracket 624. The location and operation of spindle lock 606 is similar to the spindle lock described above and illustrated in FIGS. 1 and 6. Thus, a detailed description is not repeated herein.

It should be appreciated by those skilled in the art that various modifications and variations can be made in the present invention without departing from the scope and spirit of the invention. It is intended that the present invention cover such modifications and variations as come within the scope and spirit of the appended claims and their equivalents.

What is claimed is:

1. A chuck for use with a manual or powered driver having a drive shaft and a housing, said chuck comprising:
   a. a generally cylindrical body having a nose section and a tail section, said generally cylindrical chuck body being rotationally fixed to the drive shaft of the driver and said nose section having an axial bore formed therein;
   b. a plurality of jaws movably disposed with respect to said generally cylindrical body in communication with said axial bore;
   c. a nut rotatably mounted about said generally cylindrical body and in operative communication with said jaws so that rotation of said nut in a closing direction moves said jaws toward the axis of said axial bore and rotation of said nut in an opening direction moves said jaws away from said axis;
   d. a catch formed on one of the drive shaft and said generally cylindrical body, said catch comprising a plurality of equally spaced recesses formed about a circumference of said generally cylindrical body tail section; and
   e. at least one lock body comprising a plurality of balls forward of and rotationally fixed to the driver housing and moveable between
      a unlocked first position at which said generally cylindrical body is rotatable with respect to the driver housing and
      a locked second position at which said at least one lock body engages said catch to rotationally lock said generally cylindrical body to the driver housing,
      wherein said plurality of balls is moveable into and out of engagement with said plurality of recesses such that all balls simultaneously engage said recesses in said locked second position and disengage said recesses in said unlocked first position.

2. The chuck of claim 1, further comprising an annular collar that receives said lock body.

3. The chuck of claim 2 wherein said annular collar is rotationally fixed to the driver housing.

4. The chuck of claim 1, said at least one lock body comprising a circular button and a spring, wherein said spring biases said button away from said catch.

5. The chuck of claim 1, said catch comprising a polygonally shaped flange axially and rotationally coupled to the drive shaft.

6. The chuck of claim 5, said at least one lock body comprising an annular collar defining
   a. a polygonally shaped hole sized and shaped to receive said polygonally shaped flange, and
   b. a polygonally shaped bore that receives a portion of the driver housing, wherein said lock body is rotationally fixed to the driver housing and axially moveable relative to the driver housing and the drive shaft.

7. The chuck of claim 6, wherein said lock body is axially moveable between
   a. a first position at which said generally cylindrical body is rotatable with respect to the driver housing, and
   b. a second position at which said polygonally shaped flange is received in said polygonally shaped hole so that said generally cylindrical body is rotationally fixed to the driver housing.

8. A chuck for use with a manual or powered driver having a drive shaft and a housing, said chuck comprising:
   a. a generally cylindrical body having a nose section and a tail section, said generally cylindrical chuck body being rotationally fixed to the drive shaft of the driver and said nose section having a first axial bore formed therein;
   b. a plurality of jaws movably disposed with respect to said generally cylindrical body in communication with said axial bore;
   c. a nut rotatably mounted about said body and in operative communication with said jaws so that rotation of said nut in a closing direction moves said jaws toward the axis of said first axial bore and rotation of said nut in an opening direction moves said jaws away from said axis;
   d. a sleeve received about and rotationally coupled to said nut;
   e. a plurality of recesses formed on an outer circumference of one of the drive shaft and said generally cylindrical body,
   f. a first annular collar received intermediate said generally cylindrical body and the driver housing, said first annular collar defining a second axial bore therethrough and at least one first radial bore in communication with said second axial bore;
   g. a second annular collar received about an outer circumference of said first annular collar, said second annular collar being axially fixed and rotatable with respect to said first annular collar; and
   h. a at least one lock body being received in said at least one first radial bore,
      wherein said at least one lock body is rotationally fixed to the driver housing and moveable between
      a unlocked first position at which said generally cylindrical body is rotatable with respect to the driver housing and
      a locked second position at which said lock body engages one of said plurality of recesses to rotationally lock said generally cylindrical body to the driver housing.

9. The chuck of claim 8, said at least one lock body comprising a circular button and a spring, wherein said spring radially biases said button away from said plurality of recesses to said unlocked first position.

10. The chuck of claim 8, said first annular collar defining a plurality of blind bores formed therein, said plurality of blind bores adapted to receive a respective plurality of pins extending from the driver housing to rotationally lock said first annular collar to the driver housing.

11. The chuck of claim 8, wherein said second annular collar defines at least one cam surface on an inner circumference thereof proximate said lock body so that annular rotation of said second annular collar with respect to said first annular collar moves said lock body between said unlocked first position and said locked second position.

12. A chuck for use with a manual or powered driver having a drive shaft and a housing, said chuck comprising:
- a. a generally cylindrical body having a nose section and a tail section, said generally cylindrical chuck body being rotationally fixed to the drive shaft of the driver and said nose section having a first axial bore formed therein;
- b. a plurality of jaws movably disposed with respect to said generally cylindrical body in communication with said axial bore;
- c. a nut rotatably mounted about said generally cylindrical body and in operative communication with said jaws so that rotation of said nut in a closing direction moves said jaws toward the axis of said first axial bore and rotation of said nut in an opening direction moves said jaws away from said axis;
- d. a sleeve received about and rotationally coupled to said nut; and
- e. an annular collar received intermediate said generally cylindrical body and the driver housing, said annular collar defining a polygonally shaped axial bore therethrough, said annular collar receiving a polygonally shaped portion of the driver housing within said polygonally shaped axial bore thereby rotationally fixing said annular collar to the driver housing, said annular collar further including at least one spring coupled to said annular collar and positioned parallel to an axis of said polygonally shaped axial bore such that said at least one spring axially biases said annular collar away from said driver housing, wherein said first annular collar is moveable between
    - an unlocked first position at which said generally cylindrical body is rotatable with respect to the driver housing and
    - a locked second position at which said polygonally shaped axial bore receives the polygonally shaped driver housing portion to rotationally lock said generally cylindrical body to the driver housing.

13. The chuck of claim 12, said annular collar further comprising a plurality of springs coupled to said annular collar and positioned parallel to an axis of said polygonally shaped axial bore such that said plurality of springs axially biases said annular collar away from said driver housing.

14. The chuck of claim 12, said annular collar further comprising an annular flange about an outer circumference thereof.

15. The chuck of claim 12, wherein one of the driver drive shaft and said generally cylindrical body contains a polygonally shaped flange that is axially and rotationally fixed to said one of the driver drive shaft and said generally cylindrical body and is received by said annular collar polygonally shaped axial bore.

\* \* \* \* \*